(12) United States Patent
Sisbot

(10) Patent No.: US 10,232,710 B2
(45) Date of Patent: Mar. 19, 2019

(54) WIRELESS DATA SHARING BETWEEN A MOBILE CLIENT DEVICE AND A THREE-DIMENSIONAL HEADS-UP DISPLAY UNIT

(71) Applicant: TOYOTA JIDOSHA KABUSHIKI KAISHA, Toyota-shi, Aichi-ken (JP)

(72) Inventor: Emrah Akin Sisbot, Mountain View, CA (US)

(*) Notice: Subject to any disclaimer, the term of this patent is extended or adjusted under 35 U.S.C. 154(b) by 113 days.

(21) Appl. No.: 15/080,433

(22) Filed: Mar. 24, 2016

(65) Prior Publication Data
US 2017/0274771 A1    Sep. 28, 2017

(51) Int. Cl.
*B60K 35/00* (2006.01)
*G02B 27/01* (2006.01)
*H04W 4/02* (2018.01)
*G06T 11/60* (2006.01)
*H04W 76/10* (2018.01)

(52) U.S. Cl.
CPC .......... *B60K 35/00* (2013.01); *G02B 27/0101* (2013.01); *G06T 11/60* (2013.01); *H04W 4/02* (2013.01); *H04W 76/10* (2018.02); *B60K 2350/106* (2013.01); *B60K 2350/1068* (2013.01); *B60K 2350/2013* (2013.01); *B60K 2350/2017* (2013.01);
(Continued)

(58) Field of Classification Search
CPC ............ B60K 35/00; B60K 2350/2017; B60K 2350/357; G02B 27/0101; G02B 2027/0141; G06T 11/60; H04W 4/02; H04W 76/02
See application file for complete search history.

(56) References Cited

U.S. PATENT DOCUMENTS 8,521,411 B2    8/2013 Grabowski et al.
9,021,049 B2    4/2015 Bai et al.
(Continued)

FOREIGN PATENT DOCUMENTS

JP    2015174051 A1    9/2015

OTHER PUBLICATIONS

Mojio, "Glympse and Mojio Partner to Provide Location Sharing Beyond the Smartphone," http://bit.ly/1T4xQN6, downloaded on Mar. 25, 2016, pp. 1-3.

*Primary Examiner* — Sahlu Okebato
(74) *Attorney, Agent, or Firm* — Burbage Law, P.C.; Jon-Michael Burbage; Elizabeth Ruzich

(57) ABSTRACT

The disclosure includes a system and method for wireless data sharing between a mobile client device and a three-dimensional heads-up display unit. A system may include a three-dimensional heads-up display unit ("3D HUD") installed in a vehicle. The system may include a memory storing instructions that, when executed, cause the system to: establish a peer-to-peer video stream between a mobile client device and the vehicle; generate live video data for providing a video stream for causing a screen of the mobile client device to display visual content of the 3D HUD that includes substantially live images depicting what the driver of the vehicle sees when looking at the 3D HUD; and stream the live video data to the mobile client device to cause the screen of the mobile client device to display the video stream that depicts what the driver of the vehicle sees when looking at the 3D HUD.

21 Claims, 12 Drawing Sheets

(52) U.S. Cl.
CPC ............................ *B60K 2350/2052* (2013.01);
*B60K 2350/357* (2013.01); *G02B 2027/0141*
(2013.01)

(56) References Cited

U.S. PATENT DOCUMENTS

| | | | |
|---|---|---|---|
| 2002/0169551 A1* | 11/2002 | Inoue | G01C 21/26 |
| | | | 701/469 |
| 2008/0072264 A1* | 3/2008 | Crayford | H04L 29/06027 |
| | | | 725/86 |
| 2013/0304278 A1 | 11/2013 | Chen | |
| 2014/0160002 A1* | 6/2014 | Dent | G06F 3/038 |
| | | | 345/156 |
| 2014/0256258 A1 | 9/2014 | DeLuca | |
| 2015/0210287 A1* | 7/2015 | Penilla | B60W 40/08 |
| | | | 701/49 |

* cited by examiner

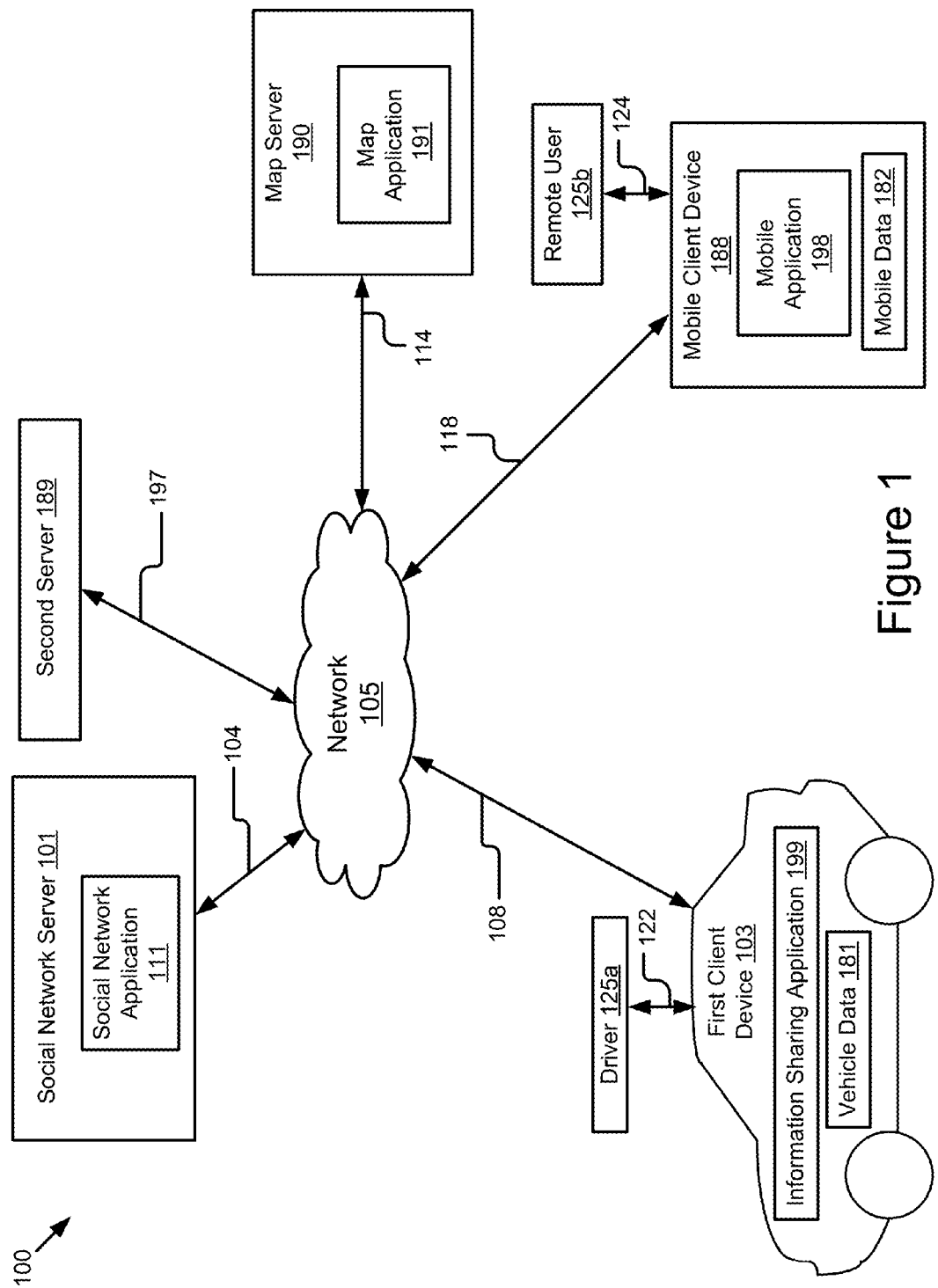

600

(A)

Information sharing application transmits (1) GPS coordinates for vehicle to the mobile client device and (2) video data for the video stream between the vehicle and the mobile client device. All of this data may be transmitted via the encrypted VPN tunnel.. 610

Mobile application receives the GPS coordinates for the vehicle from the encrypted VPN tunnel and displays the location on a graphical map of the mobile client device. 612

Mobile application receives the video stream and displays the video stream on the mobile client device. 614

Mobile application establishes a chat session or voice connection between the mobile client device and the vehicle so that the driver and the remote user can collaborate to share directions or destinations. 616

Information sharing application causes the 3D HUD to display the location of the remote user. 716

Information sharing application retrieves and provides the driver with navigation instructions for driving to the location of the remote user. This may be deployed for ride sharing services. 718

WIRELESS DATA SHARING BETWEEN A MOBILE CLIENT DEVICE AND A THREE-DIMENSIONAL HEADS-UP DISPLAY UNIT

BACKGROUND

The specification relates to wireless data sharing between a mobile client device and a three-dimensional heads-up display unit.

Drivers may interact with people who are not in their vehicle. For example, a driver may be in a vehicle and interacting with another person who is located many miles away from the vehicle.

Vehicles may be equipped with a heads-up display unit ("HUD"). Mobile phones are increasing in popularity. Drivers, passengers and other people are likely to have a mobile phone in the United States, Japan, Europe and other industrialized parts of the world.

SUMMARY

Described are implementations that may include an information sharing application for a driver of a vehicle including a three-dimensional heads-up display unit (3D HUD) to share information with a mobile client device that wirelessly communicates with the vehicle. The mobile client device may share information with the vehicle. Example implementations are depicted in FIGS. 3A, 3B, 4 and 5.

In some implementations, an information sharing application installed in a vehicle including a 3D HUD may facilitate a shared driving experience where a remote person who is not in the vehicle can experience and participate in the driving experience remotely using their smartphone (or some other mobile client device). The 3D HUD and the smartphone may communicate with each other wirelessly. Some or all of the content that the driver sees in the 3D HUD can be wirelessly transmitted to the smartphone. The remote user may look at their smartphone and see some or all of the content that the driver sees in the 3D HUD.

In some implementations, the communication between the 3D HUD and the smartphone may be bidirectional. For example, the location of the remote passenger can be displayed on the 3D HUD. In this way, the driver of the vehicle can use the 3D HUD to easily locate the remote person.

In some implementations, the ability to display the location of the remote person on the 3D HUD may benefit a vehicle that is used for a ride sharing service (e.g., a taxi service). For example, assume the vehicle is a taxi vehicle and the remote person is a potential customer of the taxi. The information sharing application beneficially enables the remote person to share their location with the taxi vehicle so that the taxi driver can easily locate them. Experimentation has shown that this feature of the information sharing application for the 3D HUD is particularly advantageous in a crowded city where taxi driver's struggle to locate their particular customer among the various people who may be on the sidewalk at any given moment.

In some implementations, the information sharing application may enable a driver of a vehicle having a 3D HUD to share information with a mobile client device that wirelessly communicates with the vehicle. Existing solutions do not consider, for example: (1) how to use a 3D HUD to provide information to a remote user; or (2) how to use a mobile client device to modify the functionality of a 3D HUD. By contrast, the information sharing application considers both of these problems.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computer-implemented method including: pairing a 3D HUD installed in a vehicle with a mobile client device, where the pairing is established via a wireless communicative coupling shared by the vehicle and the mobile client device; generating live video data for causing a screen of the mobile client device to display visual content that is viewable by a driver of the vehicle when looking at the 3D HUD; and streaming the live video data to the mobile client device via the wireless communicative coupling shared by the vehicle and the mobile client device so that the screen of the mobile client device displays the visual content that depicts in at least substantially real time what the driver of the vehicle sees when looking at the 3D HUD. Other embodiments of this aspect include corresponding computer systems, apparatus, and computer programs recorded on one or more computer storage devices, each configured to perform the actions of the methods.

Implementations may include one or more of the following features. The method where the pairing includes establishing an encrypted peer-to-peer video stream between the 3D HUD of the vehicle and the mobile client device so that the mobile client device streams the live video data via the encrypted peer-to-peer video stream. The method where the communicative coupling is encrypted so that only the mobile client device may stream the live video data. The method where the wireless communicative coupling includes an encrypted virtual private network tunnel that is only accessible by the vehicle and the mobile client device. The method where the live video data includes one or more real world images captured by a camera mounted to the vehicle that captures the one or more real world images as viewed by the driver when looking at the 3D HUD. The method where the live video data includes graphical data that describes graphical overlays that are viewable by the driver when looking at a real world through the 3D HUD so that the screen of the mobile client device displays (1) the one or more real world images that the driver sees when looking at the 3D HUD and (2) the graphical overlays that the driver sees when looking at the 3D HUD. The method further including: determining location data describing a set of global positioning system coordinates for the vehicle; and transmitting the location data to the mobile client device to cause the screen of the mobile client device to display an electronic map depicting a location of the vehicle on the electronic map. The method further including: receiving location data describing a set of global positioning system coordinates for the mobile client device; and displaying, on the 3D HUD, an electronic map that depicts a location of the mobile client device so that the location of the mobile client device is viewable by the driver on at least a portion of the 3D HUD. The method further including: determining that the vehicle is located close enough to a user of the mobile client device so that the user is viewable by the driver when looking through the 3D HUD; generating a graphical overlay to distinguish the user among other items viewable by the driver through the 3D HUD; and displaying the graphical overlay in the 3D HUD proximate to the user so that the driver can identify the user among the other items viewable by the driver through the 3D HUD. Implementations of the described techniques may include hardware, a method or process, or computer software on a computer-accessible medium.

One general aspect includes a computer program product including a non-transitory computer-usable medium including a computer-readable program, where the computer-readable program when executed on a computer causes the computer to: establish a peer-to-peer video stream between an information sharing application associated with a 3D HUD installed in a vehicle and a mobile application of a mobile client device via a wireless communicative coupling shared by the vehicle and the mobile client device; generate live video data for causing a screen of the mobile client device to display visual content that includes images that are viewable by a driver of the vehicle when looking at the 3D HUD; and stream the live video data to the mobile client device via the wireless communicative coupling shared by the vehicle and the mobile client device, where the mobile application and the live video data are executed by a processor of the mobile client device to cause the screen of the mobile client device to display the peer-to-peer video stream that includes the visual content that includes the images that are viewable by the driver of the vehicle when looking at the 3D HUD. Other embodiments of this aspect include corresponding computer systems, apparatus, and computer programs recorded on one or more computer storage devices, each configured to perform the actions of the methods.

Implementations may include one or more of the following features. The computer program product where the visual content is streamed to the mobile client device in substantially real time. The computer program product where the computer-readable program when executed on a computer is further configured to cause the computer to: determine location data describing a set of global positioning system coordinates for the vehicle; and transmit the location data to the mobile client device, where the processor of the mobile client device executes the mobile application and the location data to cause the screen of the mobile client device to display an electronic map depicting a location of the vehicle on the electronic map and an estimated time of arrival for the vehicle to arrive at a location of the mobile client device. The computer program product where the computer-readable program when executed on a computer is further configured to cause the computer to: receive location data describing a set of global positioning system coordinates for the mobile client device; and display, on the 3D HUD, an electronic map that depicts a location of the mobile client device so that the location of the mobile client device is viewable by the driver on at least a portion of the 3D HUD. The computer program product where the computer-readable program when executed on a computer is further configured to cause the computer to: determine that the vehicle is located close enough to a user of the mobile client device so that the user is viewable by the driver when looking through the 3D HUD; generate a graphical overlay to distinguish the user among other items viewable by the driver through the 3D HUD; and display the graphical overlay in the 3D HUD on top of the user so that the driver can identify the user among the other items viewable by the driver through the 3D HUD. The computer program product where the computer-readable program when executed on a computer is further configured to cause the computer to: receive location data describing a set of global positioning system coordinates for the mobile client device; determine a reference frame that includes a portion of the 3D HUD the driver of the vehicle is viewing; convert the set of global positioning system coordinates to Cartesian coordinates that are included in the reference frame; and display, in the reference frame, an electronic map that depicts a location of the mobile client device so that the location of the mobile client device is viewable by the driver. Implementations of the described techniques may include hardware, a method or process, or computer software on a computer-accessible medium.

One general aspect includes a system including: a 3D HUD installed in a vehicle; and a memory storing instructions that, when executed, cause the system to: establish a peer-to-peer video stream between a mobile client device and the vehicle via a wireless communicative coupling shared by the vehicle and the mobile client device; generate live video data for causing a screen of the mobile client device to display substantially live images that depict what a driver of the vehicle sees when looking at the 3D HUD; and stream the live video data to the mobile client device via the wireless communicative coupling shared by the vehicle and the mobile client device to cause the screen of the mobile client device to display the peer-to-peer video stream that depicts in substantially real time what the driver of the vehicle sees when looking at the 3D HUD. Other embodiments of this aspect include corresponding computer systems, apparatus, and computer programs recorded on one or more computer storage devices, each configured to perform the actions of the methods.

Implementations may include one or more of the following features. The system where the instructions when executed cause the system to also: determine location data describing a set of global positioning system coordinates for the vehicle; and transmit the location data to the mobile client device to cause the screen of the mobile client device to display to an electronic map depicting a location of the vehicle on the electronic map. The system where the instructions when executed cause the system to also: receive location data describing a set of global positioning system coordinates for the mobile client device; and display, on the 3D HUD, an electronic map that depicts a location of the mobile client device so that the location of the mobile client device is viewable by the driver on at least a portion of the 3D HUD. The system where the instructions when executed cause the system to also: determine that the vehicle is located close enough to a user so that the user is viewable by the driver when looking through the 3D HUD; generate a graphical overlay to distinguish the user among other items viewable by the driver through the 3D HUD; and display the graphical overlay in the 3D HUD on top of the user so that the driver can identify the user among the other items viewable by the driver through the 3D HUD. The system where the instructions when executed cause the system to also: receive location data describing a set of global positioning system coordinates for the mobile client device; determine a reference frame that includes a portion of the 3D HUD the driver of the vehicle is viewing; determine other content displayed in the 3D HUD; convert the set of global positioning system coordinates to Cartesian coordinates that are included in the reference frame; and display, in the reference frame, an electronic map that depicts a location of the mobile client device so that the location of the mobile client device is viewable by the driver. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIG. 1 is a block diagram illustrating an example operating environment for an information sharing application and a mobile application according to some implementations.

FIGS. 6A and 6B are a flowchart of an example method for a 3D HUD to share information with a mobile client device according to some implementations.

DETAILED DESCRIPTION

Figure 2A:
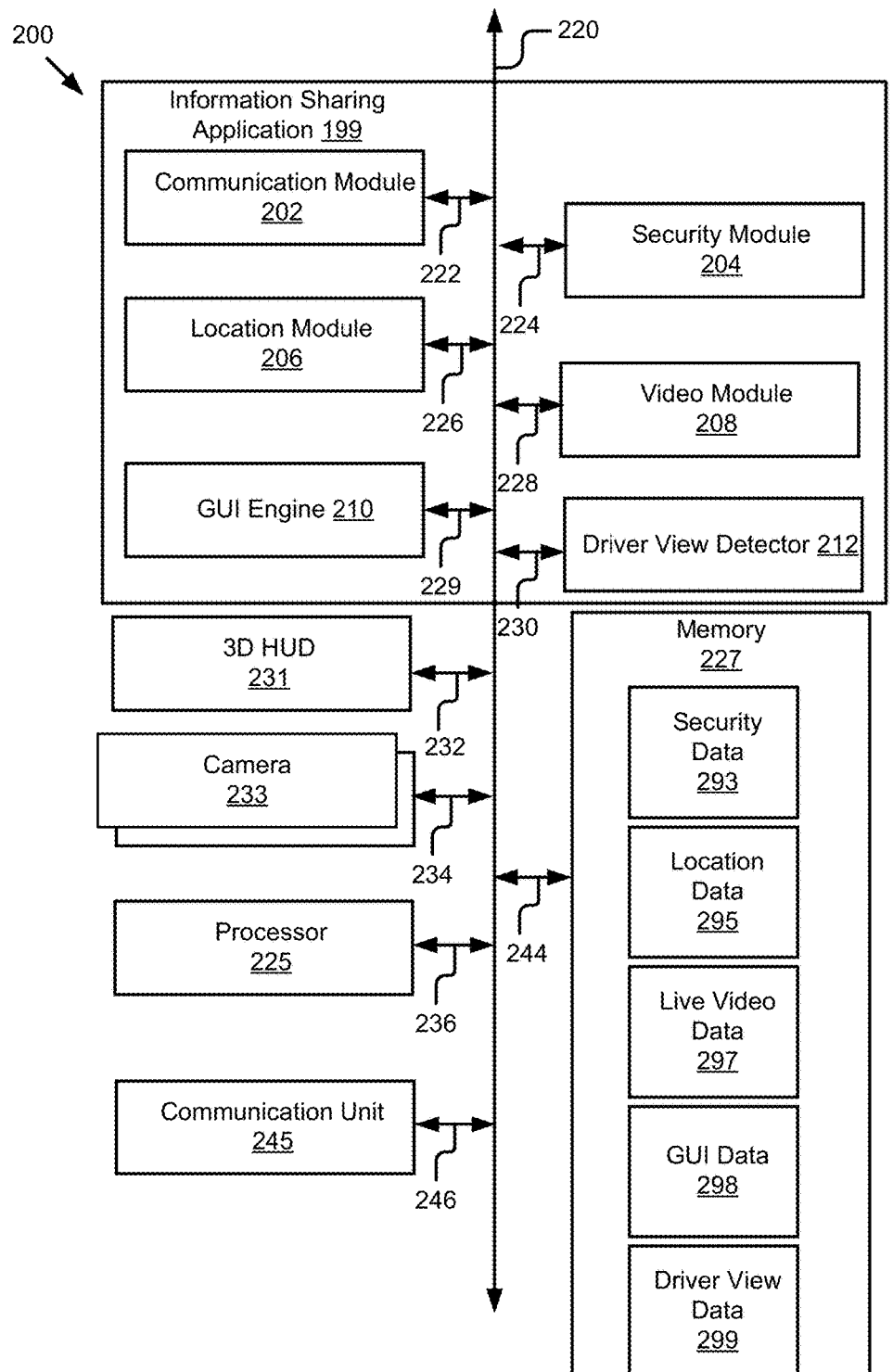
FIG. 2A is a block diagram illustrating an example computer system including an information sharing application according to some implementations.

In some implementations, an information sharing application installed in a vehicle including a 3D HUD may facilitate a shared driving experience where a remote person who is not in the vehicle can experience and participate in the driving experience remotely using their smartphone (or some other mobile client device). The 3D HUD and the smartphone may communicate with each other wirelessly. Some or all of the content that the driver sees in the 3D HUD may be wirelessly transmitted to the smartphone by the information sharing application. The remote user may look at their smartphone and see some or all of the content that the driver sees in the 3D HUD.

In some implementations, the communication between the 3D HUD and the smartphone may be bidirectional. For example, the location of the remote passenger can be displayed on the 3D HUD. In this way, the driver of the vehicle can use the 3D HUD to easily locate the remote person.

In some implementations, the ability to display the location of the remote person on the 3D HUD may have benefit a vehicle that is used for a ride sharing service (e.g., a taxi service). For example, assume the vehicle is a taxi vehicle and the remote person is a potential customer of the taxi. The information sharing application beneficially enables the remote person to share their location with the taxi vehicle so that the taxi driver can easily locate them. Experimentation has shown that this feature of the information sharing application for the 3D HUD is particularly advantageous in a crowded city where taxi driver's struggle to locate their particular customer among the various people who may be on the sidewalk at any given moment.

In some implementations, the information sharing application may cooperate with a mobile application installed on the mobile client device to enable the remote user and the driver to collaborate via voice, text, etc. For example, the driver may be having difficulty finding a destination that is familiar to the remote user and the information sharing application may initiate a chat session (or a voice call) between the driver and the remote user and the remote user may provide navigation instructions to the driver via the chat session (or the voice call).

In some implementations, the remote user may select directions for the driver on the mobile client device. For example, the remote user selects a road or a turn that the driver should take on an electronic map displayed on the mobile client device. The selection may be transmitted via chat or voice call. The 3D HUD of the vehicle may display a 3D overlay that visually depicts the suggested road or turn.

In some implementations, the remote user uses their voice to describe the directions that the driver should take and the information sharing application coverts the spoken words into text and then queries the navigation system to display a 3D overlay on the 3D HUD that visually depicts on the 3D HUD which directions the remote user is suggesting for the driver.

In some implementations, the information sharing application installed in the vehicle pairs with the mobile application installed in the mobile client device. The information sharing application may establish an encrypted virtual private network ("VPN") tunnel between the vehicle and the mobile client device. The information sharing application may determine the global positioning system ("GPS") coordinates for the vehicle. The information sharing application may determine video data for displaying the content of the 3D HUD on the screen of the mobile client device. This may include a live stream of the content of the 3D HUD displayed as a video feed for the mobile client device. For example, mobile application of the mobile client device may include functionality that can (1) establish an encrypted peer-to-peer video stream between the 3D HUD and the mobile client device and (2) receive and stream live video data displaying the content of the 3D HUD on the mobile client device. In some implementations, the video data is not stored in a server or some other location. For example, the mobile client device buffers the video stream and deletes the video data after it is displayed one time on the mobile client device (to protect user privacy and prevent the need to store large amounts of data). The 3D HUD effectively acts as a broadcaster of its content to a selected mobile client device that can then display the content of the 3D HUD on the mobile client device. In this way, the remote user can view all the content of the 3D HUD via their mobile client device.

In some implementations, the information sharing application may transmit (1) GPS coordinates for the vehicle to the mobile client device and (2) video data for the video stream between the vehicle and the mobile client device. All of this data may be transmitted via the encrypted VPN tunnel.

In some implementations, the mobile application of the mobile client device may receive the GPS coordinates for the vehicle via the encrypted VPN tunnel and display the location of the vehicle on an electronic map of the mobile client device. The mobile application may receive the video stream and display the video stream on the mobile client device.

In some implementations, the information sharing application and the mobile application may establish a chat session or voice connection between the mobile client device and the vehicle so that the driver and the remote user can collaborate to share directions, destinations or other information.

In some implementations, the information sharing application of the vehicle pairs with the mobile application of the mobile client device. The information sharing application may establish an encrypted VPN tunnel between the vehicle and the mobile client device. The mobile client device may determine GPS coordinates describing a location of the mobile client device (and hence, a location of the user of the mobile client device). The mobile application may transmit the GPS coordinates of the smartphone to the vehicle via the encrypted VPN tunnel. The vehicle may receive the GPS coordinates for the mobile client device via the encrypted VPN tunnel. The information sharing application of the vehicle may determine which portion of the 3D HUD the driver is looking at and convert the GPS coordinates to Cartesian coordinates (X,Y,Z) for displaying a GUI that depicts the location of the mobile client device on the portion of the 3D HUD that the driver is looking at. The information sharing application may generate graphical data for displaying the location of the remote user on the 3D HUD. The information sharing application may display the location of the remote user on the 3D HUD. The information sharing application may retrieve and provide the driver with navigation instructions for driving to the location of the remote user as indicated by the location of the mobile client device.

System Overview

FIG. 1 is a block diagram illustrating an example operating environment 100 for an information sharing application 199 and a mobile application 198.

The operating environment 100 includes a first client device 103, a mobile client device 188, a social network server 101, a second server 189, and a map server 190. The first client device 103 and the mobile client device 188 can be accessed by a driver 125a and a remote user 125b, via signal lines 122 and 124, respectively. In the illustrated implementation, these entities of the operating environment 100 may be communicatively coupled via a network 105. The operating environment 100 may include other servers or devices not shown in FIG. 1 including, for example, a traffic server for providing traffic data, a weather server for providing weather data, a power service server for providing power usage service (e.g., billing service), and a map server for providing map data, etc.

The first client device 103 and the mobile client device 188 in FIG. 1 can be used by way of example. While FIG. 1 illustrates two client devices 103 and 188, the disclosure applies to a system architecture having one or more client devices 103, 188. Furthermore, although FIG. 1 illustrates one network 105 coupled to the first client device 103, the mobile client device 188, the social network server 101, the second server 189, and the map server 190, in practice one or more networks 105 can be connected to these entities. While FIG. 1 includes one social network server 101, one second server 189, and one map server 190, the operating environment 100 could include one or more social network servers 101, one or more second servers 189, and one or more map servers 190.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or includes portions of a telecommunications network for sending data in a variety of different communication protocols. In some implementations, the network 105 includes Bluetooth® communication networks or a cellular communications network for sending and receiving data including via short messaging service (SMS), multimedia messaging service (MMS), hypertext transfer protocol (HTTP), direct data connection, WAP, e-mail, etc. In some implementations, the network 105 may include a GPS satellite for providing GPS navigation to the first client device 103 or the mobile client device 188. The network 105 may be a mobile data network such as 3G, 4G, LTE, Voice-over-LTE ("VoLTE"), Dedicated Short Range Communication ("DSRC"), millimeter wave communication ("mmWave communication"), or any other mobile data network or combination of mobile data networks.

In some implementations, the operating environment 100 may include a GPS satellite for providing GPS location data to the first client device 103 or the mobile client device 188 that describes the geographic location of the first client device 103 or the mobile client device 188, respectively.

In some implementations, an information sharing application 199 can be operable on the first client device 103. The first client device 103 can be a mobile client device with a battery system. For example, the first client device 103 can be one of a vehicle (e.g., an automobile, a bus), a bionic implant, or any other mobile system including non-transitory computer electronics and a battery system. In some implementations, the first client device 103 may include a computing device that includes a memory and a processor. In the illustrated implementation, the first client device 103 is communicatively coupled to the network 105 via signal line 108.

In other implementations, a mobile application 198 can be operable on the mobile client device 188. The mobile client device 188 may be a portable computing device that includes a memory and a processor, for example, a laptop computer, a tablet computer, a mobile telephone, a set top box, a smartphone, a smartwatch, a wearable, a connected device, a hub for connected devices, a personal digital assistant ("PDA"), a mobile e-mail device, a portable game player, a portable music player, or other portable electronic device capable of accessing the network 105. In some implementations, the information sharing application 199b may act in part as a thin-client application that may be stored on the first client device 103 and in part as components that may be stored on the mobile client device 188. In the illustrated implementation, the mobile client device 188 is communicatively coupled to the network 105 via a signal line 118.

In some implementations, the first client device 103 may include one or more sensors (not shown), such as a navigation sensor (e.g., a global positioning system (GPS) sensor), an infrared detector, a camera, a motion detector, a thermostat, a sound detector, and any other type of sensors. For example, the first client device 103 may include sensors for measuring one or more of a current time, a location (e.g., a latitude, longitude, and altitude of a location), an acceleration of a vehicle, a velocity of a vehicle, a fuel tank level, and a battery level of a vehicle, etc. The sensors can be used to create vehicle data 181. The vehicle data 181 can also include any information obtained during travel or received from the social network server 101, the second server 189, the map server 190, or the mobile client device 188.

The information sharing application 199 can be software for pairing the first client device 103 with the mobile client device 188 via the network 105.

In some implementations, the first client device 103 is a vehicle that includes a 3D HUD. An example of the 3D HUD is described below with reference to FIG. 2B. The 3D HUD may be an apparatus that takes up all or substantially all of the viewing area the driver would traditionally see when looking through a front windshield of the vehicle. For example, when the driver looks through any portion of the front windshield they are looking through the 3D HUD.

In some implementations, the driver of the 3D HUD may look through the 3D HUD and view the real word as well as graphical overlays generated and displayed by the 3D HUD that modify what the driver sees when looking through the 3D HUD at the real world. For example, if the driver is using a navigation system of the vehicle to navigate to a destination the 3D HUD may generate and display graphical images of directional arrows that are overlaid on top of the roadway when the driver looks through the 3D HUD so that the driver visually sees which road they should turn onto in order to follow the navigation instructions (see, e.g., FIG. 3A according to some implementations).

In some implementations, the vehicle may include one or more cameras that are mounted to the vehicle to capture one or more images that depict what the driver sees when looking through (or at) the 3D HUD. For example, the images may depict one or more of the following: (1) the real world that the driver sees when looking through the 3D HUD; and (2) the graphical overlays that the driver sees when looking through the 3D HUD. The one or more images may be included in video data. Optionally, instead of capturing images of the overlays, the information sharing application may capture pixel data that describes the graphical overlays that the driver sees when looking through the 3D HUD and store this information in the video data.

In some implementations, the video data may include a live stream of what the driver sees when looking through the 3D HUD. The video data may be transmitted by the information sharing application 199 to the mobile application 198 via the network 105. The video data may enable the remote user 125*b* to look at a screen of the mobile client device 188 and see what the driver 125A sees when looking through the 3D HUD.

In some implementations, the information sharing application 199 may include software that generates the live video data for causing a screen of the mobile client device 188 to display visual content. The visual content that is displayed by the mobile client device may depict what is viewable by the driver 125A of the vehicle when looking at the 3D HUD.

In some implementations, the information sharing application 199 may include software for streaming the live video data to the mobile client device 188 via the network 105 so that the screen of the mobile client device 188 displays video content that depicts in at least substantially real time what the driver 125A of the vehicle sees when looking at the 3D HUD.

Figure 3A:
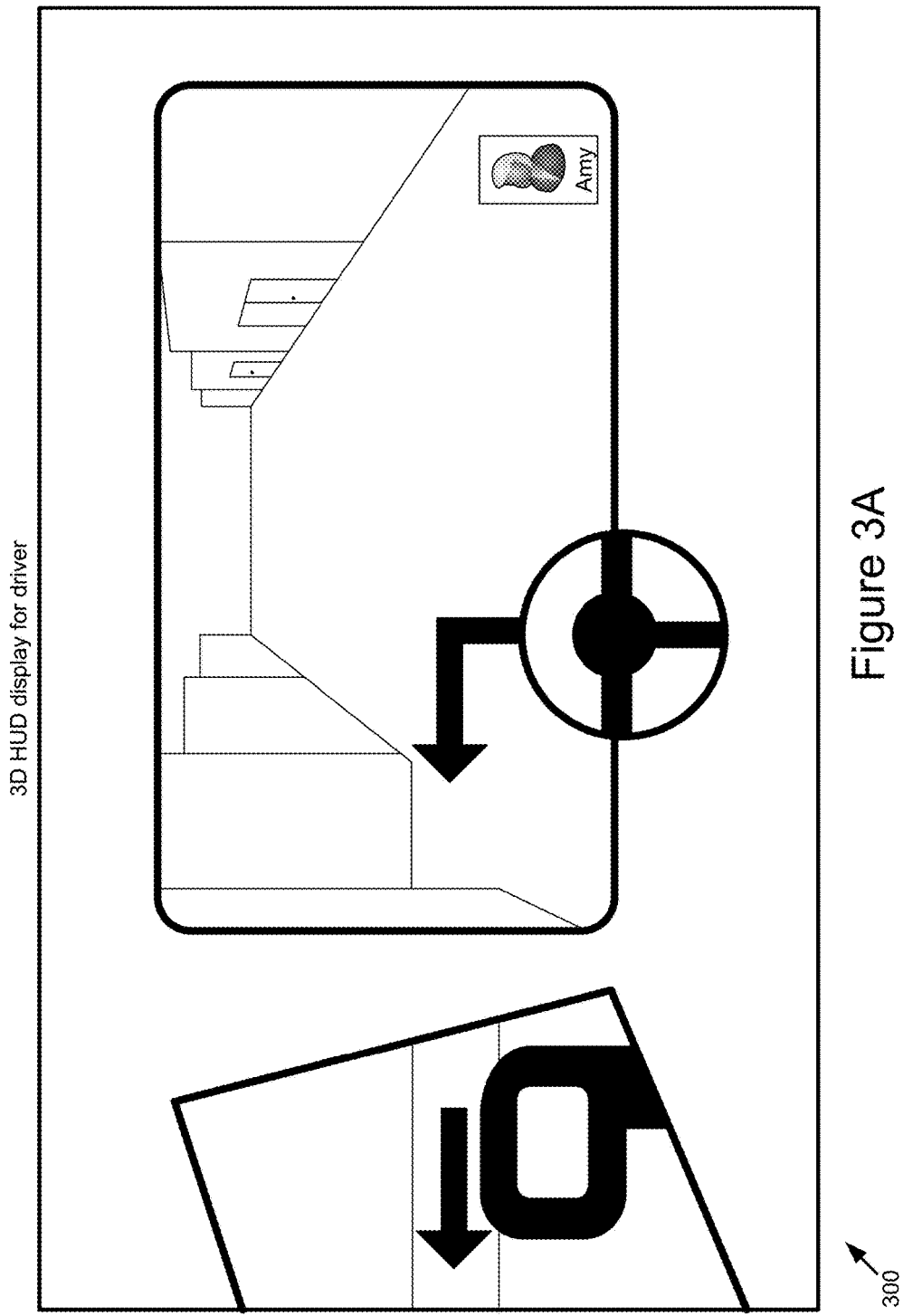
FIG. 3A is a graphic representation of what the driver of a vehicle sees when looking at a 3D HUD installed in the vehicle, the 3D HUD including a graphical user interface ("GUI") displayed in the 3D HUD to assist the driver to locate a remote user according to some implementations.
Figure 4:
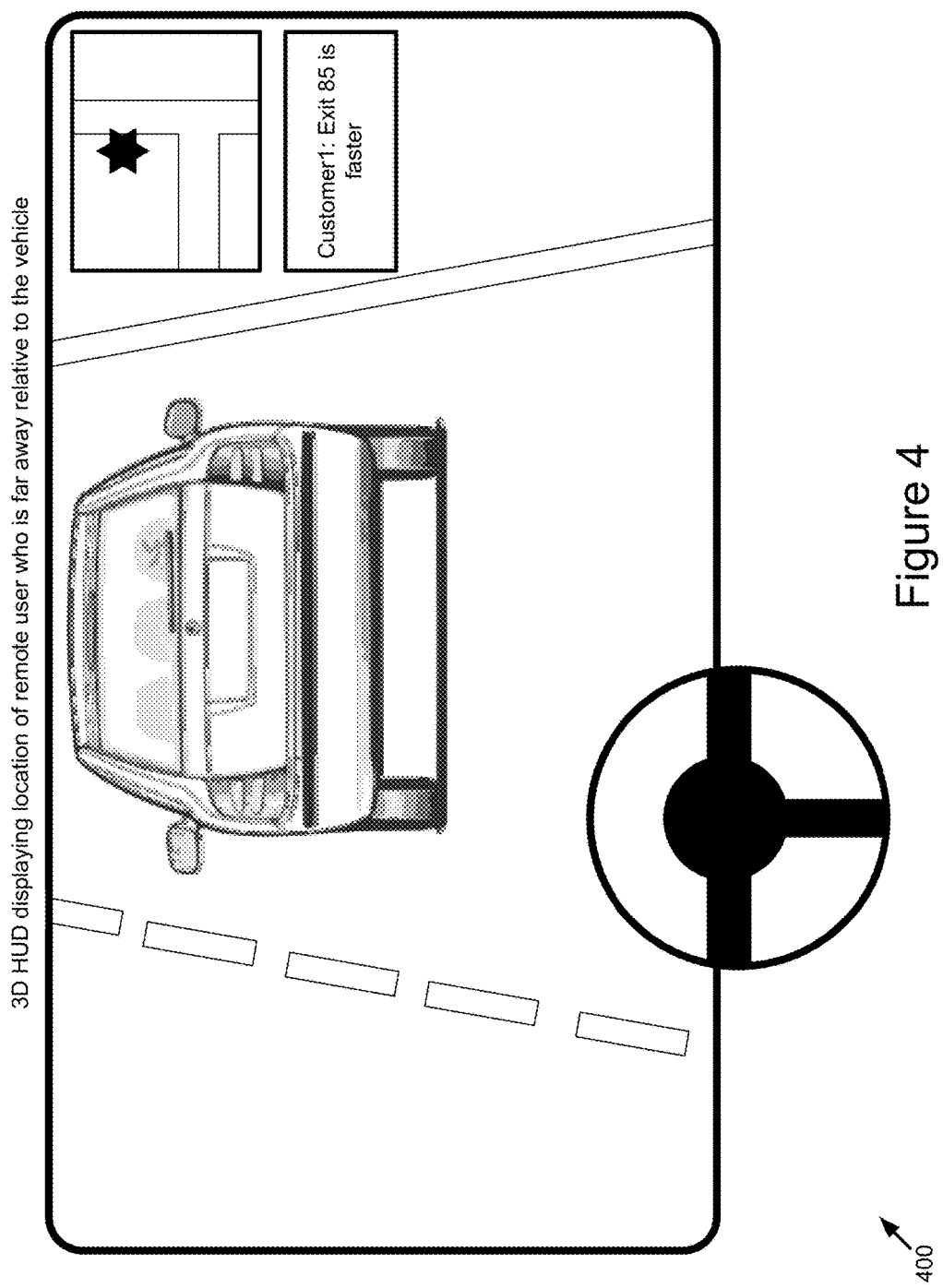
FIG. 4 is a graphic representation of a GUI displayed in the 3D HUD to assist the driver of a vehicle including the 3D HUD to locate a remote user using an electronic map displayed in a region of the 3D HUD selected based on the view of the driver according to some implementations.
Figure 5:
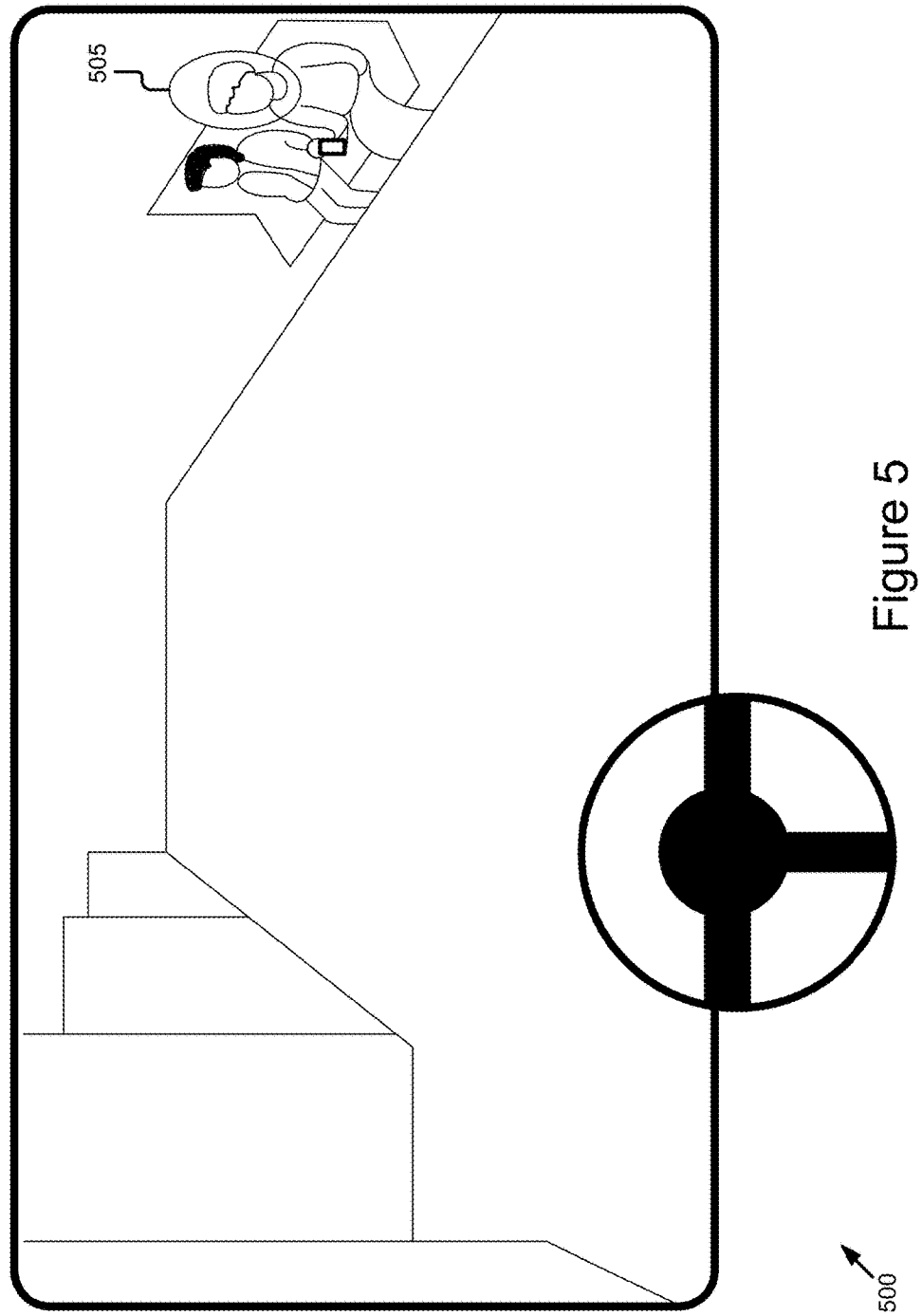
FIG. 5 is a graphic representation of a GUI displayed in the 3D HUD to assist the driver of a vehicle including the 3D HUD to identify the remote user when the remote user is close enough to the vehicle so that the remote user is viewable by the driver when looking through the 3D HUD according to some implementations.

In some implementations, the information sharing application 199 may include code and routines that, when executed by a processor of the first client device 103, cause the 3D HUD of the vehicle to display one or more of the GUIs depicted in FIGS. 3A, 4 and 5.

In some implementations, the information sharing application 199 may include code and routines that, when executed by a processor of the first client device 103, cause the processor to execute one or more of the steps described below with reference to methods 600 or 700 depicted in FIGS. 6A, 6B, 7A and 7B.

In some implementations, the information sharing application 199 can be implemented using hardware including a field-programmable gate array ("FPGA") or an application-specific integrated circuit ("ASIC"). In some other implementations, the information sharing application 199 can be implemented using a combination of hardware and software. The information sharing application 199 may be stored in a combination of the devices and servers, or in one of the devices or servers.

The vehicle data 181 may include any data necessary for the information sharing application 199 to provide its functionality.

The information sharing application 199 is described in more detail below with reference to FIG. 2A.

In some implementations, the mobile client device 188 may include one or more sensors (not shown), such as a GPS sensor, an infrared detector, a camera, a motion detector, a thermostat, a sound detector, and any other type of sensors. For example, the mobile client device 188 may include a GPS sensor to determine the geographic location of the mobile client device 188. The mobile data 182 may describe the measurements of the one or more sensors.

In some implementations, the mobile client device 188 may include software that receives live video data from the network 105 and displays a live stream that includes the visual content of the 3D HUD displayed as a video feed for viewing by the remote user 125B of the mobile client device 188. For example, mobile application 198 of the mobile client device 188 may include functionality that can (1) establish an encrypted peer-to-peer video stream between the first client device 103 and the mobile client device 188 and (2) receive and stream live video data displaying the content of the 3D HUD included in the first client device 103 on a screen of the mobile client device 188. In some implementations, the video data is not stored in a server or some other location. For example, the mobile application 198 causes the mobile client device 188 to buffer the video stream and delete the video data after it is displayed one time on the mobile client device 188 (e.g., to protect the driver's 125A privacy and prevent the need to store large amounts of data). In this way, the 3D HUD of the first client device 103 may effectively act as a broadcaster of its content to a selected mobile client device 188 that can then display the content of the 3D HUD on the mobile client device 188. In this way, the remote user 125B can view all the content of the 3D HUD via their mobile client device 188.

In some implementations, the mobile application 198 may transmit GPS coordinates for the mobile client device 188 to the first client device 103 via the network 105 to cause the 3D HUD to display an electronic map depicting the location of the mobile client device 188.

In some implementations, the mobile application 198 may receive the GPS coordinates for the first client device 103 and display the location of the first client device 103 on an electronic map of the mobile client device.

In some implementations, the mobile application 198 may establish a chat session or voice connection between the mobile client device 188 and the first client device 103 so that the driver 125A and the remote user 125B can collaborate to share directions, destinations or other information.

Figure 3B:
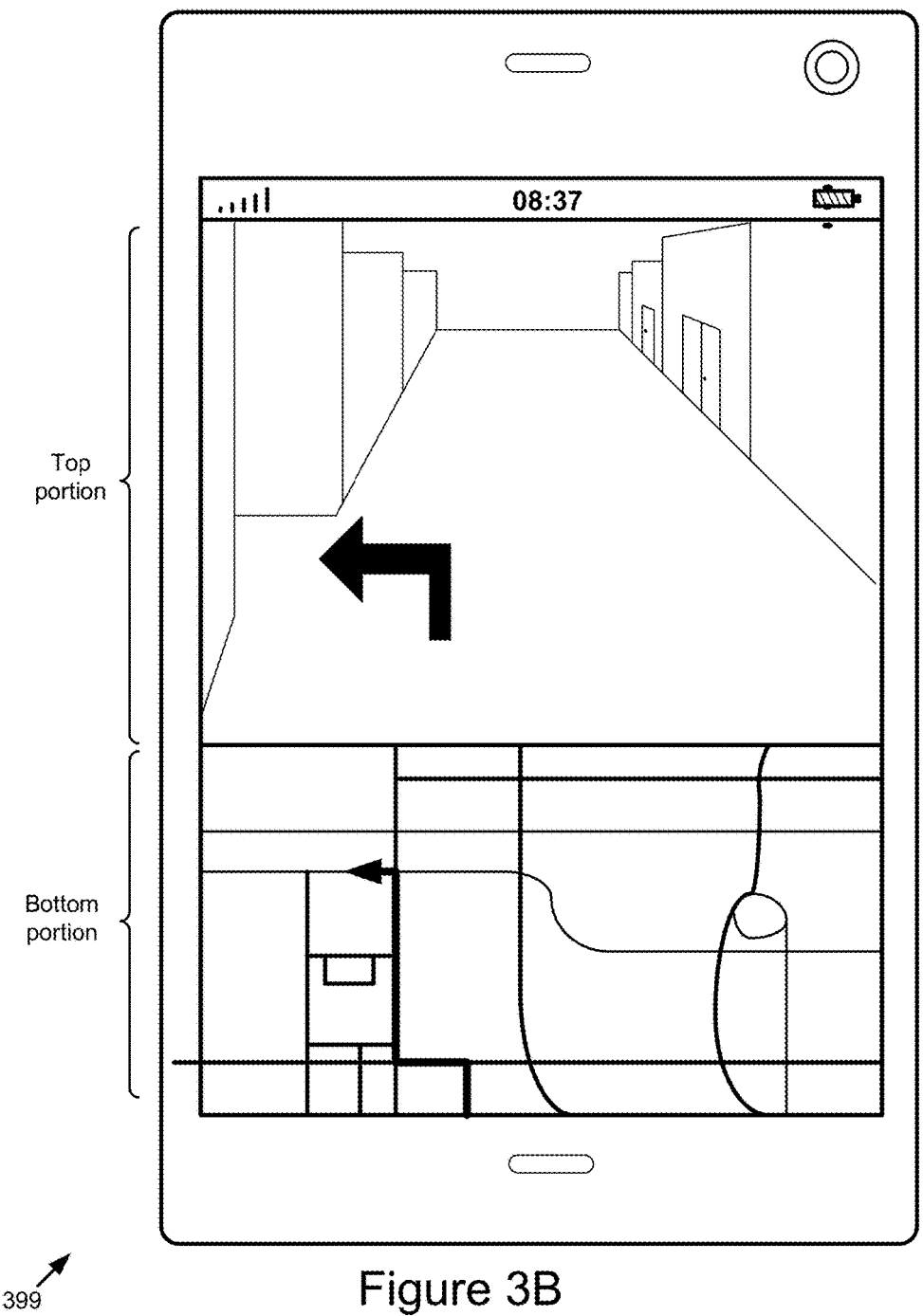
FIG. 3B is a graphic representation of a GUI displayed on a mobile client device of the remote user to depict what the driver sees when looking at the 3D HUD and allow the remote user to view on their mobile client device what the driver sees when looking at the 3D HUD according to some implementations.

In some implementations, the mobile application 198 may include code and routines that, when executed by a processor of the mobile client device 188, cause the screen of the mobile client device 188 to display the GUI depicted in FIG. 3B.

In some implementations, the mobile application 198 may include code and routines that, when executed by a processor of the mobile client device 188, cause the processor to execute one or more of the steps described below with reference to methods 600 or 700 depicted in FIGS. 6A, 6B, 7A and 7B.

In some implementations, the mobile application 198 can be implemented using hardware including a field-programmable gate array ("FPGA") or an application-specific integrated circuit ("ASIC"). In some other implementations, the mobile application 198 can be implemented using a combination of hardware and software. The mobile application 198 may be stored in a combination of the devices and servers, or in one of the devices or servers.

The mobile application 198 is described in more detail below with reference to FIG. 2C.

The mobile data 182 may include any data necessary for the mobile application 198 to provide its functionality.

The social network server 101 can be a hardware server that includes a processor, a memory, and network communication capabilities. In the illustrated implementation, the social network server 101 is coupled to the network 105 via a signal line 104. The social network server 101 sends and receives data to and from other entities of the operating environment 100 via the network 105.

The social network server 101 includes a social network application 111. A social network can be a type of social structure where the driver 125A and the remote user 125B may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related.

In some implementations, the social network application 111 generates a social network that may be used for determining traffic updates. For example, the social network application 111 could be a microblog where people post about accidents on major highways, a forum where people discuss speed traps, a social network where the user has friends that talk about congested surface roads, etc. In some implementations, the information sharing application 199 enables the driver 125A and the remote user 125B to interact or collaborate with one another inside the social network via an interface of the 3D HUD. For example, the chat session in which the driver 125A and the remote user 125B collaborate may be provided via the social network application 111.

It is understood that the social network server 101 and the social network application 111 can be representative of one social network and that there may be multiple social networks coupled to the network 105, each having its own server, application, and social graph. For example, a first social network may be more directed to business networking, a second may be more directed to or centered on academics, a third may be more directed to local business, a fourth may be directed to dating, and others may be of general interest or a specific focus.

The map server 190 can be a hardware server that includes a processor, a memory, and network communication capabilities. In the illustrated implementation, the map server 190 is coupled to the network 105 via a signal line 114. The map server 190 sends and receives data to and from other entities of the operating environment 100 via the network 105. The map server 190 includes a map application 191. The map application 191 may generate a map and directions for the driver 125A or the remote user 125B. In one implementation, the map application 191 receives a request for directions from the driver 125A to travel from point A to point B and transmits the request to the map server 190. The map application 191 generates directions and a map and transmits the directions and map to the information sharing application 199 for display to the user via the 3D HUD.

In some implementations, the operating environment 100 includes a second server 189 that is coupled to the network via signal line 197. The second server 189 may store additional information that is used by the information sharing application 199, such as infotainment, music, etc. In some implementations, the second server 189 receives a request for data from the information sharing application 199 (e.g., data for streaming a movie, music, etc.), generates the data, and transmits the data to the information sharing application 199.

Example Systems

Referring now to FIG. 2A, an example of a computer system 200 including the information sharing application 199 is depicted.

FIG. 2A is a block diagram of a computer system 200 that includes the information sharing application 199, a processor 225, a memory 227, a 3D HUD 231, one or more cameras 233 and a communication unit 245 according to some examples. The components of the computer system 200 are communicatively coupled by a bus 220. In some implementations, the computer system 200 can be the first client device 103.

The processor 225 includes an arithmetic logic unit, a microprocessor, a general-purpose controller, or some other processor array to perform computations and provide electronic display signals to a display device. The processor 225 is coupled to the bus 220 for communication with the other components via a signal line 236. The processor 225 processes data signals and may include various computing architectures including a complex instruction set computer (CISC) architecture, a reduced instruction set computer (RISC) architecture, or an architecture implementing a combination of instruction sets. Although FIG. 2A includes a single processor 225, multiple processors 225 may be included. Other processors, operating systems, sensors, displays, and physical configurations may be possible.

The memory 227 stores instructions or data that may be executed by the processor 225. The memory 227 is coupled to the bus 220 for communication with the other components via a signal line 244. The instructions or data may include code for performing the techniques described herein. The memory 227 may be a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2A, the memory 227 stores one or more of the following: security data 293; location data 295; live video data 297; GUI data 298; and driver view data 299.

The security data 293 may include data necessary for encrypting communications between the first client device 103 and the mobile client device 188. The security data 293 may include one or more private or public keys. The security data may 293 include information necessary for establishing a VPN shared among the first client device 103 and the mobile client device 188. The network 105 may include the VPN. The VPN may include an encrypted VPN tunnel. The VPN tunnel may be configured so that it is only accessible by the first client device 103 and the mobile client device 188. The security data 293 may include data for pairing the first client device 103 and the mobile client device 188.

The location data 295 may describe the location of one or more of the following: the first client device 103; and the mobile client device 188. The location data 295 may describe the latitude and longitude of the first client device 103 or the mobile client device 188.

The live video data 297 may describe data necessary to provide a video stream of content that depicts what the driver 125A sees when look through the 3D HUD 231. The live video data 297 may include images of the real world as well as graphical overlays that are displayed on the 3D HUD to enrich the driving experience for the driver 125A.

The GUI data 298 includes graphical data for generating one or more of the GUIs described herein. For example, the 3D HUD 231 may receive the GUI data 298 and display one or more GUIs based on the GUI data 298.

The driver view data 299 describes a region of the 3D HUD 231 where the the driver 125A is gazing. The driver view data 299 may also describe one or more regions of the 3D HUD 231 where graphical content (e.g., generated based on the GUI data 298) may be displayed without distracting the driver 125A.

The 3D HUD 231 is described in more detail below with reference to FIG. 2B. The 3D HUD 231 may be communicatively coupled to the bus 220 via a signal line 232.

The camera 233 includes one or more digital cameras for capturing the images necessary to provide the live video data 297 to the mobile client device 188. The one more cameras may capture images of what the driver 125A sees when viewing the 3D HUD 231 (e.g., see FIG. 3A). In some implementations, the one images may include stereoscopic images for generating panoramas used to provide virtual reality content for display on the mobile client device 188. The camera 233 is communicatively coupled to the bus 220 via a signal line 234.

In some implementations, at least one of the cameras 233 is a digital camera mounted to the interior of the first client device 103 and configured to monitor the gaze of the driver 125B and determine which region of the 3D HUD 231 the driver 125B is viewing. For example, the interior camera 233 records the driver's 125A face and, in particular, the driver's 125A eyes and their gaze relative to the 3D HUD 231.

The communication unit 245 transmits and receives data to and from the mobile client device 188. The communication unit 245 is coupled to the bus 220 via a signal line 246. In some implementations, the communication unit 245 includes a port for direct physical connection to the network 105 or to another communication channel. For example, the communication unit 245 includes a USB, SD, CAT-5, or similar port for wired communication with the first client device 103. In some implementations, the communication unit 245 includes a wireless transceiver for exchanging data with the first client device 103 or other communication channels using one or more wireless communication methods, including IEEE 802.11, IEEE 802.16, BLUETOOTH®, DSRC, mmWave communication or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, etc.

The information sharing application 199 comprises a communication module 202, a security module 204, a location module 206, a video module 208, a GUI engine 210 and a driver view detector 212.

The communication module 202 is communicatively coupled to the bus 220 via a signal line 222. The security module 204 is communicatively coupled to the bus 220 via a signal line 224. The location module 206 is communicatively coupled to the bus 220 via a signal line 226. The video module 208 is communicatively coupled to the bus 220 via a signal line 228. The GUI engine 210 is communicatively coupled to the bus 220 via a signal line 229. The driver view detector 212 is communicatively coupled to the bus 220 via a signal line 230.

The communication module 202 can be software including routines for handling communications between the information sharing application 199 and other components of the computer system 200. In some implementations, the communication module 202 can be a set of instructions executable by the processor 225 to provide the functionality described below for handling communications between the information sharing application 199 and other components of the computer system 200. In some implementations, the communication module 202 can be stored in the memory 227 of the computer system 200 and can be accessible and executable by the processor 225.

The communication module 202 receives data and transfers the data, via the communication unit 245, to the other components of the operating environment 100. For example, the communication module 202 transmits the live video data 297 to the network 105 for transmission to the mobile client device 188. In another example, the communication module 202 receives location data 295 from a GPS satellite (not pictured) after the location module 206 requests the geographic location of the computer system 200.

The communication module 202 receives data and transfers the data to the other components of the computer system 200. For example, the communication module 202 receives the live video data 297 from the video module 208 and either stores it on the memory 227 or provides it to the communication unit 245.

The communication module 202 may communicate with the mobile client device 188 via the communication unit 245. For example, the communication module 202 receives the live video data 297 from the video module 208 and transmits the live video data 297 to the mobile client device 188 via the communication unit 245 and the network 105.

The communication module 202 can communicate with elements of the first client device 103. For example, the first client device 103 is a vehicle that includes a GPS unit and the communication module 202 receives location data 295 describing the location of the vehicle from the GPS unit.

The security module 204 can be software including routines for providing secured communication between the first client device 103 and the mobile client device 188. For example, the security module 204 encrypts the communication between the first client device 103 and the mobile client device 188 using the security data 293. In another example, the security module 204 generates an encrypted VPN tunnel between the first client device 103 and the mobile client device 188. The security module 204 may provide other functionality for securing communication between the first client device 103 and the mobile client device 188. In some implementations, the security module 204 can be stored in the memory 227 of the computer system 200 and can be accessible and executable by the processor 225.

In some implementations, the mobile application 198 includes the data and software necessary at the mobile client device 188 to participate in secure communications with the first client device 103 via the network 105. For example, mobile application 198 includes code and routines as well as the data and information necessary to decrypt data received from the first client device 103 via the network 105 or communicate with the information sharing application 199 via an encrypted VPN tunnel.

The location module 206 can be software including routines for determining the location of the first client device 103 and providing this information to the mobile client device 188 via the network 105. For example, the location module 206 may call a GPS unit of the first client device 103 and receive location data 295 describing the location of the first client device 103. The location module 206 may cause the communication module 202 to provide the location data 295 to the mobile client device 188 via the communication unit 245 and the network 105.

In some implementations, the location module 206 may include software including routines for assisting the GUI engine 210. For example, the communication module 202 may provide location data 295 received from the network 105 that describes a location of the mobile client device 188. The location module 206 may analyze the location data 295 to assist the GUI engine 210 to display an electronic map in the 3D HUD 231 that depicts the location of the mobile client device 188 on the electronic map based on the location data 295. The location data 295 may include a set of GPS coordinates describing the location of the mobile client device 188. The set of GPS coordinates may include a latitude and a longitude associated with the location of the mobile client device 188. The location module 206 may analyze the location data 295 to determine the set of GPS coordinates for the mobile client device 188. The location module 206 may cause the communication module 202 to transmit a query to the map server 190 for map data. The query may include the set of GPS coordinates of the mobile client device 188. The query may return GUI data 298 included graphical data describing a GUI that includes the electronic map and the location of the mobile client device 188 on the electronic map.

In some implementations, the location module 206 may convert the set of global positioning system coordinates to Cartesian coordinates that are included in a reference frame identified by the driver view detector 212. The GUI engine 210 can be software including routines for receiving the GUI data 298 and causing the 3D HUD 231 to display a GUI described by the GUI data 298. In this example, the GUI engine 210 may receive the GUI data 298 including the graphical data describing the GUI that includes the electronic map and the location of the mobile client device 188 on the electronic map. The GUI engine 210 may cause the 3D HUD 231 to display, in a reference frame determined by the driver view detector 212, the electronic map that depicts the location of the mobile client device 188 so that the location of the mobile client device 188 is viewable by the driver 125A.

In some implementations, the location module 206 can be stored in the memory 227 of the computer system 200 and can be accessible and executable by the processor 225.

In some implementations, the video module 208 may include software including routines for providing live video data 297 to the mobile client device 188 via the network 105. For example, the communication module 202 may provide a video feed or live video stream to the mobile client device 188 based on the live video data 297. In some implementations, the video module 208 can be stored in the memory 227 of the computer system 200 and can be accessible and executable by the processor 225.

The GUI engine 210 can be software including routines for receiving the GUI data 298 and causing the 3D HUD 231 to display a GUI described by the GUI data 298. Example GUIs generated by the GUI engine 210 include those depicted in FIGS. 3A, 4 and 5. Other examples are possible. In some implementations, the GUI engine 210 can be stored in the memory 227 of the computer system 200 and can be accessible and executable by the processor 225.

The driver view detector 212 can be software including routines for determining which region of the 3D HUD 231 the driver 125A is viewing at a given time. For example, an internal camera 233 captures an image of the driver 125A. The image is oriented to enable the driver view detector 212 to identify which region of the 3D HUD 231 the eyes of the driver 125A are viewing. In some implementations, the driver view detector 212 can be stored in the memory 227 of the computer system 200 and can be accessible and executable by the processor 225.

Figure 2B:
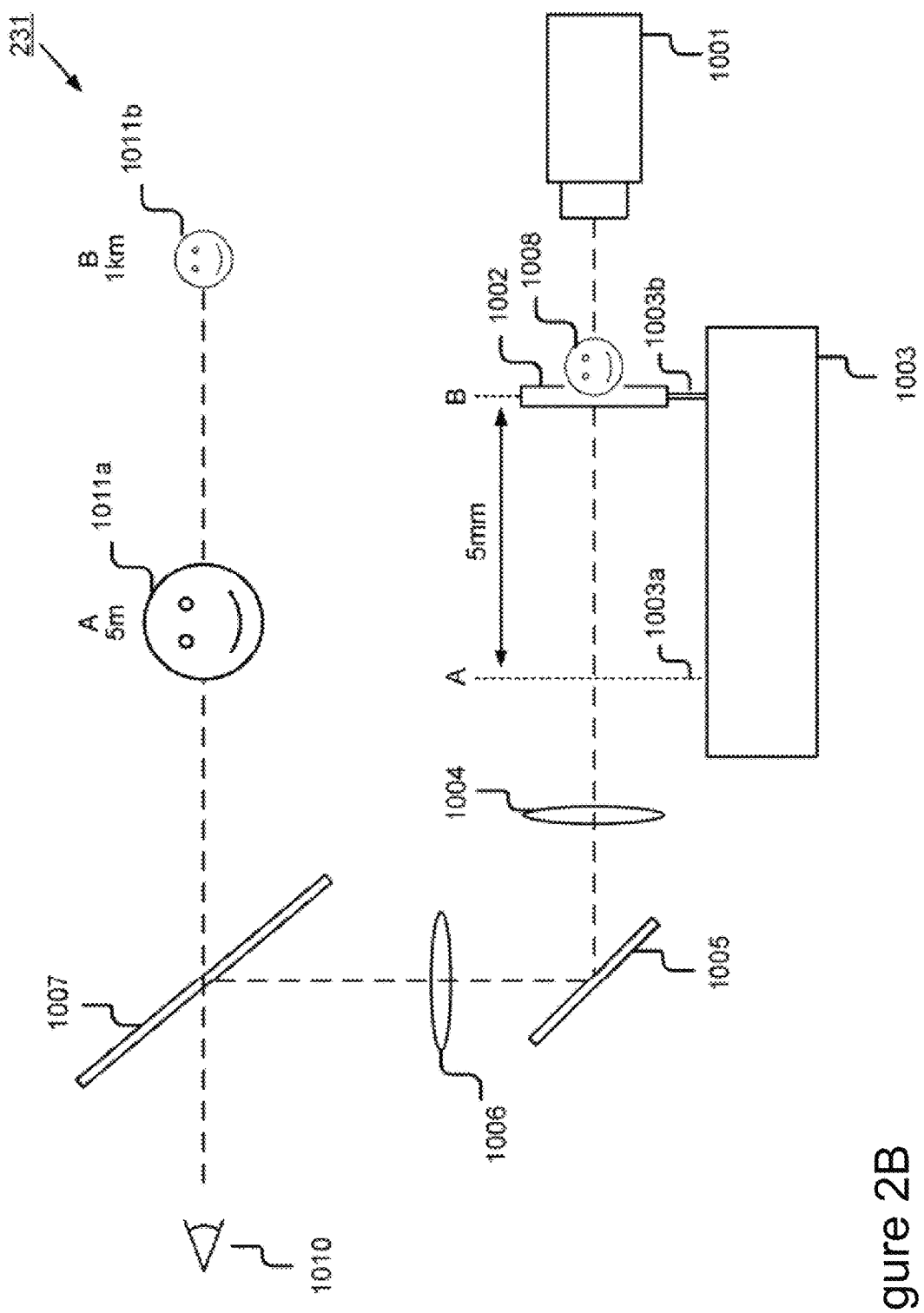
FIG. 2B is a block diagram illustrating an 3D HUD according to some implementations.

Referring to FIG. 2B, depicted is a block diagram illustrating an 3D HUD 231 according to some implementations.

In some implementations, the 3D HUD 231 includes a projector 1001, a movable screen 1002, a screen-driving unit 1003, an optical system (including lenses 1004, 1006, reflector 1005, etc.). The projector 1001 may be any kind of projector such as a digital mirror device (DMD) project, a liquid crystal projector. The projector 1001 projects an image (graphic) 1008 on the movable screen 1002. The movable screen 1002 includes a transparent plate and so the projected image lights transmit through the movable screen 1002 to be projected on the windshield 1007 of a vehicle (first client device 103). The image projected on the windshield 1007 is perceived by a driver 1010 as if it is a real object (shown as 1011a, 1011b) that exists in the three-dimensional space of the real world, as opposed to an object that is projected on the windshield.

In some implementations, the 3D HUD 231 is capable of controlling the direction of the image relative to the driver 1010 (in other words, the image position in the windshield) by adjusting the projection position on the screen 1002. Further the screen 1002 is movable by the screen-driving unit 1003 in the range between the positions 1003a and 1003b. Adjusting the position of the screen 1002 can vary the depth (distance) of the projected image from the driver 1010 in the real world. In one example, the movable range of the screen 1002 (distance between positions 1003a and 1003b) may be 5 mm, which correspond to from 5 m away to infinity in the real world. The use of the 3D HUD 231 allows the driver 1010 to perceive the projected image exist in the real world (three-dimensional space). For example, when an image is projected at the same three-dimensional position (or substantially same depth at least) as a real object (such as a pedestrian, car, etc.), the driver does not need to adjust eye focus in order to view the projected image, resulting in easy grasp of the projected image while looking at the real object.

The 3D HUD 231 depicted in FIG. 2B is provided by way of example. Other examples are possible. These examples may include heads-up displays having more or less complexity than the 3D HUD 231 depicted in FIG. 2B. For example, it is anticipated that in the future there will be heads-up displays that do not require movable parts such as the movable screen 1002. For example, a static screen that does not move may be deployed. The heads-up display deployed may not be a two-dimensional heads-up display unit. The information sharing application 199 described above with reference to FIG. 2A is designed to be operable with such components.

Figure 2C:
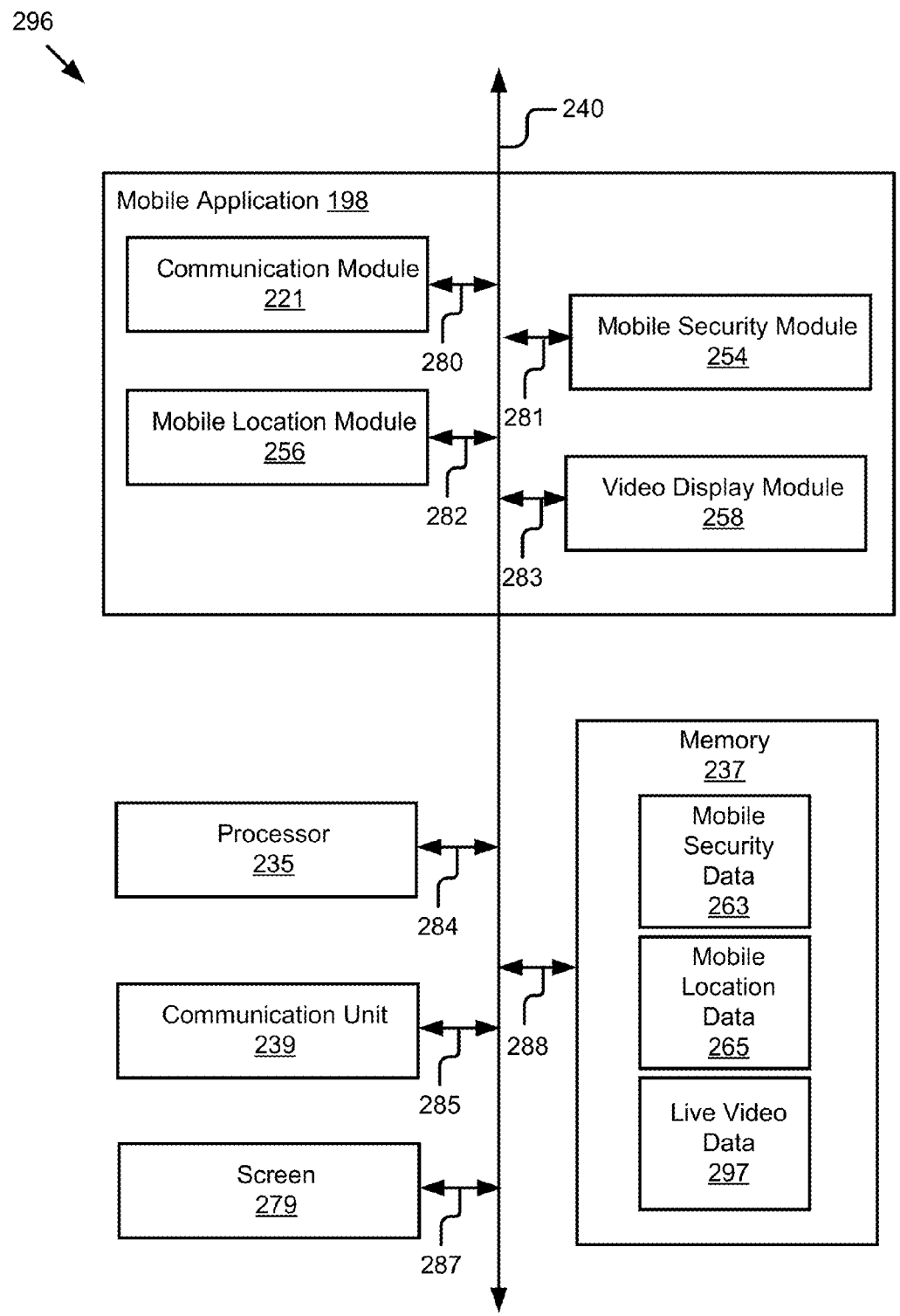
FIG. 2C is a block diagram illustrating an example computer system including a mobile application according to some implementations.

Referring now to FIG. 2C, depicted is a block diagram illustrating an example computer system 296 including a mobile application 198 according to some implementations. As depicted, the computer system 296 includes the mobile application 198, a screen 279, a processor 235, a memory 237, and a communication unit 239. The computer system 296 may include the mobile client device 188. The components of the computer system 296 are communicatively coupled by a bus 240.

The screen 279 includes a display for rending graphical content. The graphical content may include a video feed or live video stream transmitted by the first client device 103. For example, the screen 279 is a display of a smartphone that displays a live video stream that depicts what the driver 125A sees when looking at the 3D HUD 231. The remote user 125B may view the screen 279 and see what the driver 125A sees when looking at the 3D HUD 231 in real time or substantially real time. The screen 279 is coupled to the bus 240 via a signal line 287.

The processor 235 and the communication unit 239 are similar to the processor 225 and the communication unit 245 that are discussed with reference to FIG. 2A and, so, these descriptions will not be discussed again. The processor 235 is communicatively coupled to the bus 240 via a signal line 284. The communication unit 239 is communicatively coupled to the bus 240 via a signal line 285

The memory 237 stores instructions or data that may be executed by the processor 235. The memory 237 is coupled to the bus 240 for communication with the other components via a signal line 288. The instructions or data may include code for performing the techniques described herein. The memory 237 may be a dynamic random access memory (DRAM) device, a static random access memory (SRAM) device, flash memory, or some other memory device. In some implementations, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2B, the memory 237 may store any of the mobile security data 263, the mobile location data 265 and the live video data 297.

The communication unit 239 may receive the live video data 297 from the network 105. For example, the information sharing application 199 provides the live video data 297 as a live video stream or a video feed for display on the screen 279 of the computer system 296. The live video data 297 was described above with reference to FIG. 2A, and so, that description will not be repeated here.

The mobile security data 263 may include data necessary for participating in encrypted communications between the first client device 103 and the mobile client device 188. The mobile security data 263 may include one or more private or public keys. The mobile security data may 263 include information necessary for establishing or participating in a VPN shared among the first client device 103 and the mobile client device 188. The network 105 may include the VPN. The VPN may include an encrypted VPN tunnel. The VPN tunnel may be configured so that it is only accessible by the first client device 103 and the mobile client device 188. The mobile security data 263 may include data for pairing the first client device 103 and the mobile client device 188.

The mobile location data 265 may describe the location of one or more of the following: the first client device 103; and the mobile client device 188. The mobile location data 265 may describe the latitude and longitude of the first client device 103 or the mobile client device 188.

In some implementations, the mobile application 198 includes a communication module 221, the mobile security module 254, the mobile location module 256 and the video display module 258.

The communication module 221 may be communicatively coupled to the bus 240 via a signal line 280. The mobile security module 254 may be communicatively coupled to the bus 240 via a signal line 281. The mobile location module 256 may be communicatively coupled to the bus 240 via a signal line 282. The video display module 258 may be communicatively coupled to the bus 240 via a signal line 283.

The communication module 221 can be software including routines for handling communications between the mobile application 198 and other components of the computer system 296. In some implementations, the communication module 221 can be a set of instructions executable by the processor 235 to provide the functionality described below for handling communications between the mobile application 198 and other components of the computer system 296. In some implementations, the communication module 221 can be stored in the memory 237 of the computer system 296 and can be accessible and executable by the processor 235.

The communication module 221 sends and receives data, via the communication unit 239, to and from one or more of the elements of the operating environment 100. For example, the communication module 221 receives, via the communication unit 239, the live video data 297 from the network 105 after the live video data 297 is transmitted by the first client device 103. In another example, the communication module 221 receives mobile location data 265 from a GPS satellite (not pictured) after the mobile location module 256 requests the geographic location of the computer system 296.

In some implementations, the communication module 221 receives data from components of the mobile application 198 and stores the data in the memory 237. For example, the communication module 221 receives the mobile location data 265 determined by the mobile location module 256 and stores the data in the memory 237.

In some implementations, the communication module 221 may handle communications between components of the mobile application 198. For example, the communication module 221 shares the live video data 297 with the video display module 258.

The mobile security module 254 can be software including routines for providing secured communication between the first client device 103 and the mobile client device 188. For example, the mobile security module 254 decrypts the communication between the first client device 103 and the mobile client device 188 using the mobile security data 263. In another example, the mobile security module 254 accesses an encrypted VPN tunnel between the first client device 103 and the mobile client device 188 to send and receive data with the first client device 103. The mobile security module 254 may provide other functionality for securing communication between the first client device 103 and the mobile client device 188 or participating in such secured communications. In some implementations, the mobile security module 254 can be stored in the memory 237 of the computer device 296 and can be accessible and executable by the processor 235.

The mobile location module 256 can be software including routines for determining the location of the computer system 296 and providing this information to the first client device 103 via the network 105. For example, computer system 296 is a mobile client device 188 and the mobile location module 256 may call a GPS unit of the mobile client device 188 and receive mobile location data 265 describing the location of the mobile client device 188. The mobile location module 256 may cause the communication module 221 to provide the mobile location data 265 to the first client device 103 via the communication unit 239 and the network 105.

In some implementations, the mobile location module 256 may include software including routines for assisting the video display module 258. For example, the communication module 221 may provide mobile location data 265 received from the network 105 that describes a location of the first client device 188. The mobile location module 256 may analyze the mobile location data 265 to assist the video display module 258 to display an electronic map on the screen 279 that depicts the location of the first client device 103 on the electronic map based on the mobile location data 265.

In some implementations, the mobile location module 256 can be stored in the memory 237 of the computer system 296 and can be accessible and executable by the processor 235.

In some implementations, the video display module 258 may include software including routines for display the live video data 297 on the screen 279 of the computer system 296. For example, the communication module 221 may cause the screen 279 to display a video feed or live video stream based on the live video data 297. The video display module 258 may also display GUIs on the screen 279. For example, the GUI may include an electronic map depicting the geographic location of the first client device 103. Other GUIs are possible. In some implementations, video display module 258 can be stored in the memory 237 of the computer system 296 and can be accessible and executable by the processor 235.

Referring now to FIG. 3A, depicted is a graphic representation 300 of what the driver 125 of a vehicle sees when looking at a 3D HUD installed in the vehicle. The 3D HUD includes a GUI displayed in the 3D HUD to assist the driver 125A to locate a remote user 125B according to some implementations. In this example, the remote user 125B may include a person named "Amy." The GUI may include a graphical overlay depicting a real life image of Amy or an avatar that represents Amy. The computer system 200 may include graphical data for depicting the image or avatar of Amy as indicated by a user profile of Amy. The graphical data may be provided by a mobile client device 188 that is operated by Amy. The GUI may also include a graphical overlay including arrows that visually depict the turn-by-turn navigation instructions the driver 125A should follow in order to arrive at Amy's location. Contemporaneous to the visual navigation instructions provided by the 3D HUD, the navigation system of the vehicle may be providing audible navigation instructions for the driver 125A to navigate to Amy's location. As described below for FIG. 3B, the GUI may be shared with Amy's mobile client device 188 so that Amy may see what the driver 125A when the driver 125A looks at the 3D HUD.

Referring now to FIG. 3B, depicted is a graphic representation 399 of a GUI displayed on a mobile client device 188 of the remote user 125B to depict what the driver 125A of a vehicle sees when looking at the 3D HUD of a vehicle. The GUI allows the remote user 125B to view on their mobile client device 188 what the driver 125A sees when looking at the 3D HUD according to some implementations. The GUI may be a frame of video feed or a live stream provided by the information sharing application 199 that is operable in the vehicle. For example, referring to FIG. 3A, the mobile client device 188 depicted in FIG. 3B is a smartphone belonging to Amy. The smartphone includes a screen. The screen is displaying an example of a live stream provided by the vehicle referred to above for FIG. 3A. The top portion of the screen depicted in FIG. 3B includes a live feed of what the driver 125A sees when they look at the 3D HUD of their vehicle on their trip to pick up Amy. The bottom portion of the screen depicts a two dimensional map including the route being taken by the driver as they travel to pick up Amy.

In some implementations, the driver 125A may include a taxi driver and Amy may include a customer of the driver 125A. The taxi service may include a ride sharing service such as Uber™ or Lyft™.

Referring now to FIG. 4, depicted is a graphic representation 400 including a GUI displayed in the 3D HUD to assist the driver 125A of a vehicle including the 3D HUD to locate a remote user 125B using an electronic map displayed in a region of the 3D HUD selected based on the view of the driver according to some implementations. Here, the electronic map is displayed in the top right-hand corner region of the 3D HUD. The electronic map may be displayed in this region because the driver is looking at the vehicle traveling in the lane in front of them and the region is empty but also estimated to be in the peripheral vision of the driver 125A.

In some implementations, the electronic map includes directions to pick up a customer. For example, continuing with the description of FIGS. 3A and 3B, the customer may be Amy and the driver 125A may be driving to pick up Amy as part of a taxi service or ride sharing service.

FIG. 5 is a graphical representation 500 including a GUI displayed in the 3D HUD to assist the driver 125A of a vehicle including the 3D HUD to identify the remote user 125B when the remote user 125B is close enough to the vehicle so that the remote user 125B is viewable by the driver 125A when looking through the 3D HUD according to some implementations. For example, Amy may be the person with an oval-shaped graphical overlay 505 over their head. The oval-shaped graphical overlay 505 may assist the driver 125A to determine which of the two people is their customer. The oval-shaped graphical overlay 505 may include a color that is selected by the information sharing application 199 to create a color contrast versus the other colors that are near the remote user 125B. The mobile client device 188 of the remote user 125B in this example may include a GPS unit that is accurate to within 1.5 meters as required by the DSRC standard, and so, the information sharing application may be able to identify the remote user 125B with this degree of granularity for this reason.

Methods

Figure 6A:
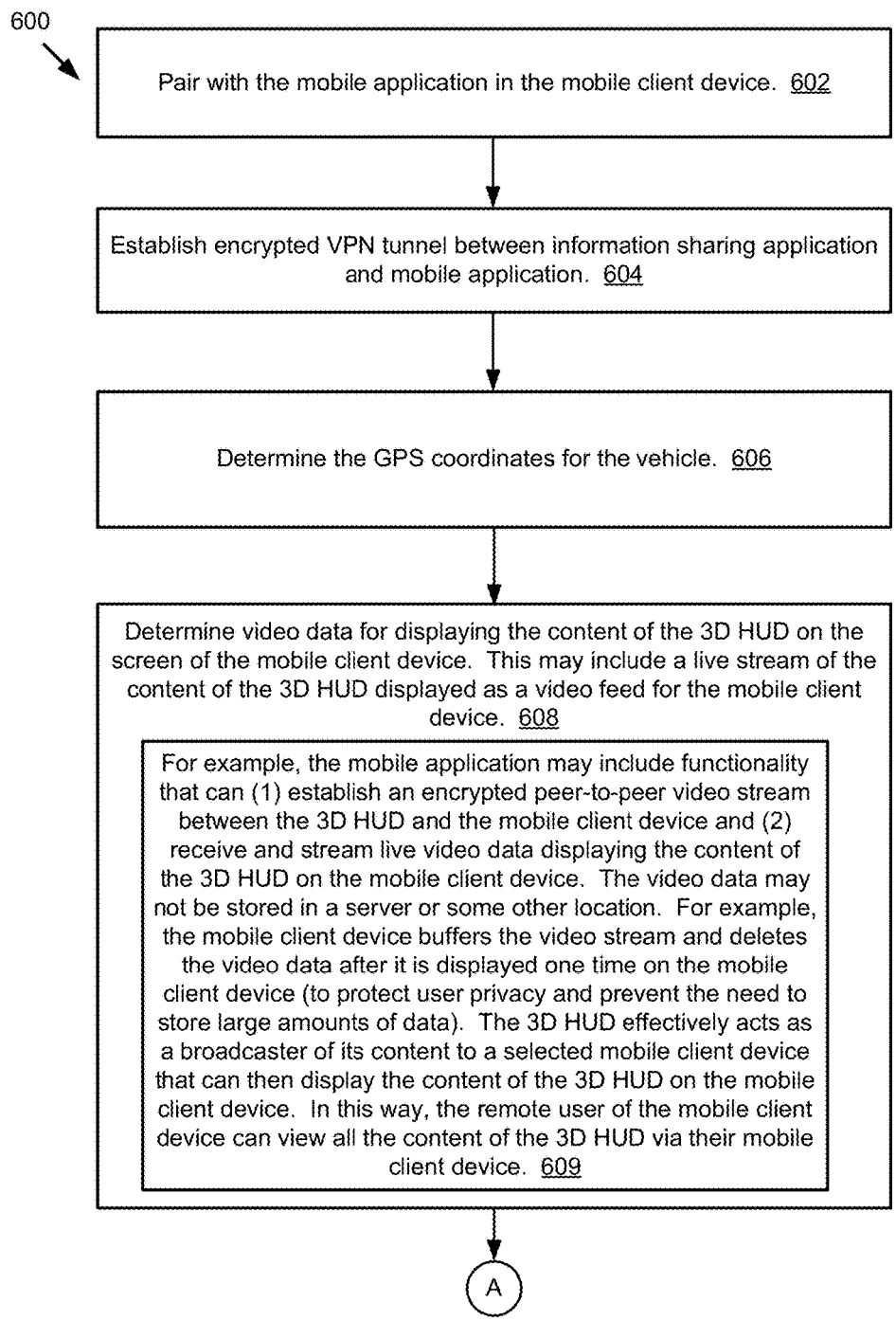

FIGS. 6A and 6B are a flowchart of an example method 600 for a 3D HUD 231 to share information with a mobile client device 188 according to some implementations.

At step 602 the information sharing application 199 installed in the first client device 103 pairs with the mobile application 198 installed in the mobile client device 188.

At step 604 the information sharing application 199 may establish a VPN tunnel or an encrypted VPN tunnel between the first client device 103 and the mobile client device 188. The VPN tunnel or the encrypted VPN tunnel are optional features. The communications between the first client device 103 and the mobile client device 188 may be encrypted or secured using other conventional methods.

At step 606, the information sharing application 199 may determine the GPS coordinates for the first client device 103.

At step 608, the information sharing application 199 may determine live video data 297 for displaying the content of the 3D HUD 231 on the screen 279 of the mobile client device 188. This may include a live stream of the content of the 3D HUD 231 displayed as a video feed for the mobile client device 188.

Element 609 includes an example implementation of step 608. For example, the mobile application 198 of the mobile client device 188 may include functionality that can (1) establish an encrypted peer-to-peer video stream between the 3D HUD 231 and the mobile client device 188 and (2) receive and stream live video data 297 displaying the content of the 3D HUD 231 on a screen 279 of the mobile client device 188. In some implementations, the live video data 297 is not stored in a server or some other location. For example, the mobile client device 188 buffers the video stream and deletes the live video data 297 after it is displayed one time on the screen 279 of the mobile client device 188. This deletion beneficially protects privacy of the driver 125A and prevents the need to store large amounts of data associated with the live video data 297. In this example, the 3D HUD 231 may effectively act as a broadcaster of its content to a selected mobile client device 188 that can then display the content of the 3D HUD 231 on a screen 179 of the mobile client device 188. In this way, the remote user 125B can view all the content of the 3D HUD 231 via their mobile client device 188.

Referring now to FIG. 6B. At step 610 the information sharing application 199 may transmit (1) GPS coordinates for the first client device 103 to the mobile client device 188 and (2) live video data 297 for the video stream between the first client device 103 and the mobile client device 188. All of this data may be transmitted via the VPN tunnel or the encrypted VPN tunnel of step 604.

At step 612, the mobile application 198 of the mobile client device 188 may receive the GPS coordinates for the first client device 103 via the VPN tunnel or the encrypted VPN tunnel. The mobile application 198 may cause the screen 179 of the mobile client device 188 to display the location of the first client device 103 on an electronic map of the mobile client device. See, for example, the bottom portion of FIG. 3B.

At step 614, the mobile application 198 may receive the video stream and display the video stream on the screen 179 of the mobile client device 188. The video stream may include the live video data 297. See, for example, the top portion of FIG. 3B.

Step 616 is depicted in FIG. 6B with a dashed line to indicate that it is an optional step of the method 600. At step 616, the information sharing application 199 and the mobile application 198 may establish a chat session or voice connection between the mobile client device 188 and the first client device 103 so that the driver 125A and the remote user 125B can collaborate to share directions, destinations or other information. The social network server 101 or the second server 189 may provide the chat service or the voice call service.

Figure 7A:
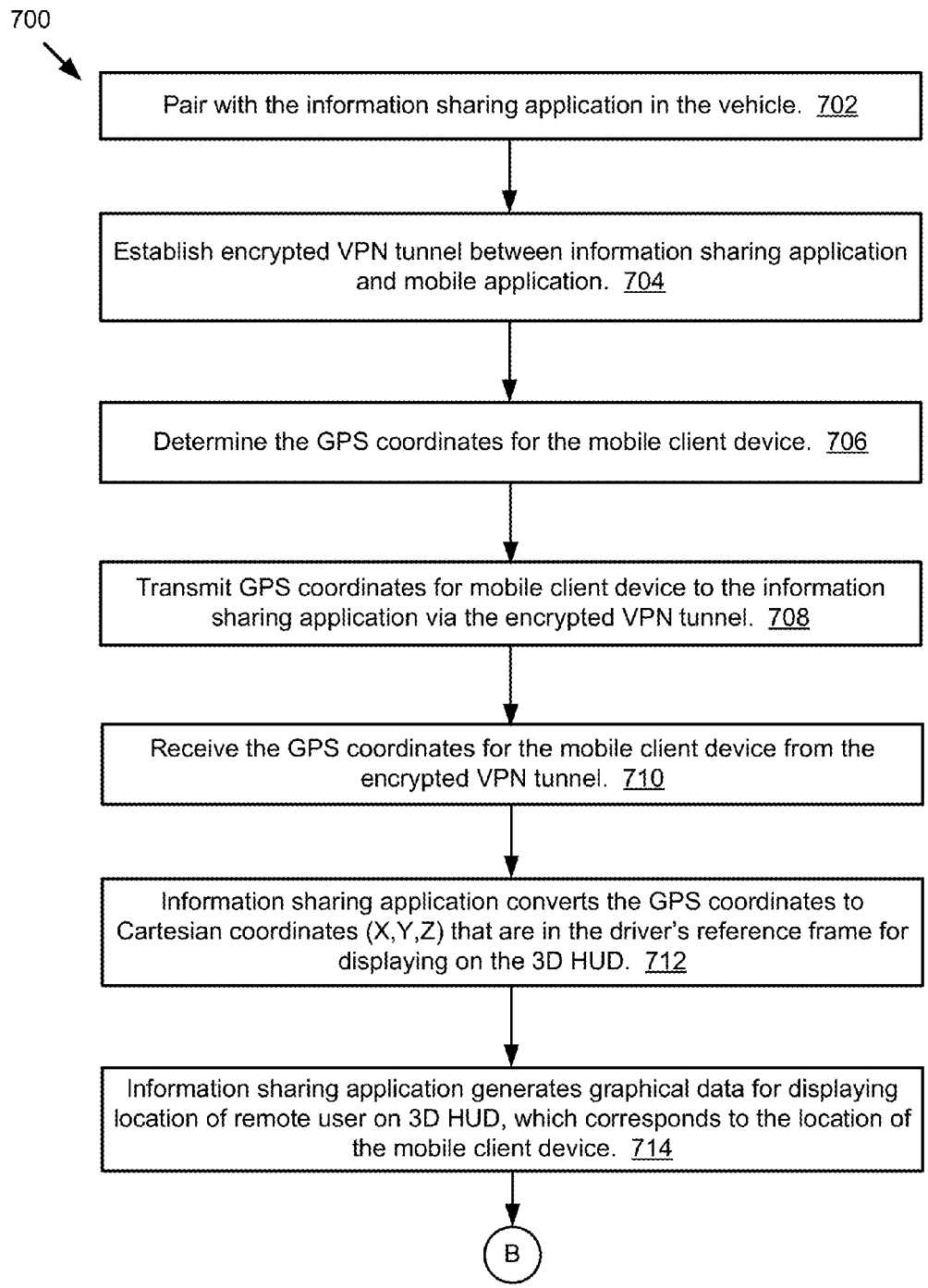
FIGS. 7A and 7B are a flowchart of an example method for a mobile client device to share information with a 3D HUD according to some implementations.
Figure 7B:

Referring now to FIGS. 7A and 7B. FIGS. 7A and 7B are a flowchart of an example method 700 for a mobile client device 188 to share information with a 3D HUD 231 according to some implementations.

Referring to FIG. 7A, at step 702 the information sharing application 199 of the first client device 103 pairs with the mobile application 198 of the mobile client device 188.

At step 704, the information sharing application 199 may establish a VPN tunnel or an encrypted VPN tunnel between the first client device 103 and the mobile client device 188. The VPN tunnel or the encrypted VPN tunnel are optional features. The communications between the first client device 103 and the mobile client device 188 may be encrypted or secured using other conventional methods.

At step 706, the mobile application 198 may determine GPS coordinates describing a location of the mobile client device 188 (and hence, a location of the remote user 125B of the mobile client device 188).

At step 708, the mobile application 198 may transmit the GPS coordinates of the mobile client device 188 to the first client device 103 via the VPN tunnel or the encrypted VPN tunnel.

At step 710, the first client device 103 may receive the GPS coordinates for the mobile client device 188 via the VPN tunnel or the encrypted VPN tunnel.

At step 712, the information sharing application 199 of the first client device 103 may determine which portion of the 3D HUD 231 the driver 125A is looking at and convert the GPS coordinates to Cartesian coordinates (X,Y,Z) for displaying a GUI that depicts the location of the mobile client device 188 on the region of the 3D HUD 231 that the driver 125A is looking at. The region including the GUI may be within the peripheral version of the portion of the 3D HUD 231 being viewed by the driver 125A.

At 714, the information sharing application 199 may generate graphical data for displaying the location of the remote user 125B on the 3D HUD 231.

Referring now to FIG. 7B, at step 716 the information sharing application 199 may display the location of the remote user 125B on the 3D HUD 231. It may be displayed in the region determined in step 712.

Step 718 is depicted with a dashed line in FIG. 7B to indicate that it is an optional feature of the method 700. At step 718 the information sharing application 199 may retrieve and provide the driver 125A with navigation instructions for driving to the location of the remote user 125B as indicated by the location of the mobile client device 188. The navigation instructions may be retrieved, for example, from the map server 190 or the second server 189.

In the above description, for purposes of explanation, numerous specific details are set forth in order to provide a thorough understanding of this disclosure. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computing device that can receive data and commands, and any peripheral devices providing services.

Reference in this disclosure to "some implementations" or "some instances" means that a particular feature, structure, or characteristic described in connection with the implementations or instances can be included in at least one implementation of the description. The appearances of the phrase "in some implementations" in various places in this disclosure are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of this disclosure can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

This disclosure can take the form of some entirely hardware implementations, some entirely software implementations or some implementations containing both hardware and software elements. In some preferred implementations, this disclosure is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device. The computer-readable medium may be a tangible or non-transitory computer-readable storage medium. The computer-readable medium may store computer executable code. The computer-readable medium may be communicatively coupled to a processor. The processor may be programmed to execute one or more portions of the computer-executable code.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, this disclosure is not described with reference to any particular programming language. It will be appreciated that a variety of programming languages may be used to implement the teachings of this disclosure as described herein.

The foregoing description of the implementations of this disclosure has been presented for the purposes of illustration and description. It is not intended to be exhaustive or to limit this disclosure to the precise form disclosed. Many modifications and variations are possible in light of the above teaching. It is intended that the scope of the disclosure be limited not by this detailed description, but rather by the claims of this application. As will be understood by those familiar with the art, this disclosure may be embodied in other specific forms without departing from the spirit or essential characteristics thereof. Likewise, the particular naming and division of the modules, routines, features, attributes, methodologies, and other aspects are not mandatory or significant, and the mechanisms that implement this disclosure or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of this disclosure is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of this disclosure, which is set forth in the following claims.

What is claimed is:

1. A computer-implemented method comprising:
pairing a three-dimensional heads-up display unit ("3D HUD") installed in a vehicle with a mobile client device, wherein the pairing is established via a wireless communicative coupling shared by the vehicle and the mobile client device;
generating live video data for causing a screen of the mobile client device to display visual content that is viewable by a driver of the vehicle when looking at the 3D HUD;
streaming the live video data to the mobile client device via the wireless communicative coupling shared by the vehicle and the mobile client device so that the screen of the mobile client device displays the visual content that depicts in at least substantially real time what the driver of the vehicle sees when looking at the 3D HUD;
receiving mobile client device location data describing a set of global positioning system coordinates for the mobile client device; and
displaying, on the 3D HUD, an electronic map that depicts a mobile client device location and a graphical overlay depicting a real-life image or an avatar of a user associated with the mobile client device.

2. The method of claim 1, wherein the pairing includes establishing an encrypted peer-to-peer video stream between the 3D HUD of the vehicle and the mobile client device so that the mobile client device streams the live video data via the encrypted peer-to-peer video stream.

3. The method of claim 1, wherein the communicative coupling is encrypted so that only the mobile client device may stream the live video data.

4. The method of claim 1, wherein the wireless communicative coupling includes an encrypted virtual private network tunnel that is only accessible by the vehicle and the mobile client device.

5. The method of claim 1, wherein the live video data includes one or more real world images captured by a camera mounted to the vehicle that captures the one or more real world images as viewed by the driver when looking at the 3D HUD.

6. The method of claim 5, wherein the live video data includes graphical data that describes the graphical overlay that is viewable by the driver when looking at a real world through the 3D HUD so that the screen of the mobile client device displays (1) the one or more real world images that the driver sees when looking at the 3D HUD and (2) the graphical overlay that the driver sees when looking at the 3D HUD.

7. The method of claim 1, further comprising:
determining vehicle location data describing a set of global positioning system coordinates for the vehicle; and
transmitting the vehicle location data to the mobile client device to cause the screen of the mobile client device to display a graphical user interface map depicting a vehicle location on the graphical user interface map.

8. The method of claim 1, wherein the graphical overlay includes the real-life image or the avatar as indicated by a user profile associated with the user.

9. The method of claim 1, further comprising:
determining that the vehicle is located close enough to the user of the mobile client device so that the user is viewable by the driver when looking through the 3D HUD;
generating graphical data for displaying an element to distinguish the user among other items viewable by the driver through the 3D HUD; and
updating the graphical overlay in the 3D HUD with the element on top of the user so that the driver can identify the user among the other items viewable by the driver through the 3D HUD.

10. A computer program product comprising a non-transitory computer-usable medium including a computer-readable program, wherein the computer-readable program when executed on a computer causes the computer to:
establish a peer-to-peer video stream between an information sharing application associated with a three-dimensional heads-up display unit ("3D HUD") installed in a vehicle and a mobile application of a mobile client device via a wireless communicative coupling shared by the vehicle and the mobile client device;
generate live video data for causing a screen of the mobile client device to display visual content that includes images that are viewable by a driver of the vehicle when looking at the 3D HUD;
stream the live video data to the mobile client device via the wireless communicative coupling shared by the vehicle and the mobile client device, wherein the mobile application and the live video data are executed by a processor of the mobile client device to cause the screen of the mobile client device to display the peer-to-peer video stream that includes the visual content that includes the images that are viewable by the driver of the vehicle when looking at the 3D HUD;
receive mobile device location data describing a set of global positioning system coordinates for the mobile client device; and
display, on the 3D HUD, an electronic map that depicts a mobile client device location and a graphical overlay depicting a real-life image or an avatar of a user associated with the mobile client device.

11. The computer program product of claim 10, wherein the visual content is streamed to the mobile client device in substantially real time.

12. The computer program product of claim 10, wherein the computer-readable program when executed on a computer is further configured to cause the computer to:
determine vehicle location data describing a set of global positioning system coordinates for the vehicle; and
transmit the vehicle location data to the mobile client device, wherein the processor of the mobile client device executes the mobile application and the vehicle location data to cause the screen of the mobile client device to display a graphical user interface map depicting a location of the vehicle on the graphical user interface map and an estimated time of arrival for the vehicle to arrive at the location of the mobile client device.

13. The computer program product of claim 10, wherein the graphical overlay further includes turn-by-turn navigation instructions for the vehicle to reach the mobile client device location.

14. The computer program product of claim 10, wherein the computer-readable program when executed on a computer is further configured to cause the computer to:
determine that the vehicle is located close enough to the user of the mobile client device so that the user is viewable by the driver when looking through the 3D HUD;
generate graphical data for displaying an element to distinguish the user among other items viewable by the driver through the 3D HUD; and
update the graphical overlay in the 3D HUD with the element on top of the user so that the driver can identify the user among the other items viewable by the driver through the 3D HUD.

15. The computer program product of claim 10, wherein the computer-readable program when executed on a computer is further configured to cause the computer to:
determine a reference frame that includes a portion of the 3D HUD the driver of the vehicle is viewing; and
convert the set of global positioning system coordinates for the mobile client device to Cartesian coordinates that are included in the reference frame;
wherein the electronic map is displayed in the reference frame.

16. A system comprising:
a three-dimensional heads-up display unit ("3D HUD") installed in a vehicle; and
a memory storing instructions that, when executed, cause the system to:
establish a peer-to-peer video stream between a mobile client device and the vehicle via a wireless communicative coupling shared by the vehicle and the mobile client device;
generate live video data for causing a screen of the mobile client device to display substantially live images that depict what a driver of the vehicle sees when looking at the 3D HUD;
stream the live video data to the mobile client device via the wireless communicative coupling shared by the vehicle and the mobile client device to cause the screen of the mobile client device to display the peer-to-peer video stream that depicts in substantially real time what the driver of the vehicle sees when looking at the 3D HUD; and
receive mobile client device location data describing a set of global positioning system coordinates for the mobile client device;
wherein the 3D HUD displays an electronic map that depicts a mobile client device location and a graphical overlay depicting a real-life image or an avatar of a user associated with the mobile client device.

17. The system of claim 16, wherein the instructions when executed cause the system to also:
determine vehicle location data describing a set of global positioning system coordinates for the vehicle; and
transmit the vehicle location data to the mobile client device to cause the screen of the mobile client device to display to a graphical user interface map depicting a vehicle location on the graphical user interface map.

18. The system of claim 16, wherein the graphical overlay includes the real-life image or the avatar as indicated by a user profile associated with the user.

19. The system of claim 16, wherein the instructions when executed cause the system to also:
determine that the vehicle is located close enough to the user of the mobile client device so that the user is viewable by the driver when looking through the 3D HUD;
generate graphical data for displaying an element to distinguish the user among other items viewable by the driver through the 3D HUD; and
update the graphical overlay in the 3D HUD with the element proximate to the user so that the driver can identify the user among the other items viewable by the driver through the 3D HUD.

20. The system of claim 16, wherein the instructions when executed cause the system to also:
determine a reference frame that includes a portion of the 3D HUD the driver of the vehicle is viewing;
determine other content displayed in the 3D HUD; and
convert the set of global positioning system coordinates for the mobile client device to Cartesian coordinates that are included in the reference frame; and
wherein the electronic map is displayed in the reference frame.

21. The method of claim 1, wherein the 3D HUD is operable so that (1) the mobile client device location is viewable by the driver on at least a portion of the 3D HUD and (2) the driver does not need to adjust eye focus in order to view the electronic map on the 3D HUD.

* * * * *